(12) United States Patent
Kiederle et al.

(10) Patent No.: US 9,968,808 B2
(45) Date of Patent: *May 15, 2018

(54) LAMINAR STRUCTURE PROVIDING ADAPTIVE THERMAL INSULATION

(75) Inventors: Guenter Kiederle, Feldkirchen/Westerham (DE); Stefan Hauer, Bad Wiessee (DE); Helga Baumgaertler, Hohenlinden (DE); Reiner Kasemann, Ottobrunn (DE); Johann Seibert, Munich (DE); Janine T. Bohlmann, Berlin (DE)

(73) Assignee: W. L. Gore & Associates GmbH, Putzbrunn (DE)

(*) Notice: Subject to any disclaimer, the term of this patent is extended or adjusted under 35 U.S.C. 154(b) by 869 days.

This patent is subject to a terminal disclaimer.

(21) Appl. No.: 13/980,965

(22) PCT Filed: Jan. 28, 2011

(86) PCT No.: PCT/EP2011/051265
§ 371 (c)(1),
(2), (4) Date: Sep. 19, 2013

(87) PCT Pub. No.: WO2012/100841
PCT Pub. Date: Aug. 2, 2012

(65) Prior Publication Data
US 2014/0004295 A1    Jan. 2, 2014

(51) Int. Cl.
*B29D 22/00* (2006.01)
*A62B 17/00* (2006.01)
(Continued)

(52) U.S. Cl.
CPC ........ *A62B 17/003* (2013.01); *A41D 31/0027* (2013.01); *B32B 5/26* (2013.01); *Y10T 428/24025* (2015.01)

(58) Field of Classification Search
CPC .... A41D 31/0027; A62B 17/003; B32B 3/28; B32B 3/30; B32B 5/26; Y10T 428/1334
See application file for complete search history.

(56) References Cited

U.S. PATENT DOCUMENTS 3,953,566 A    4/1976    Gore
4,187,390 A    2/1980    Gore
(Continued)

FOREIGN PATENT DOCUMENTS

CN    101687396    3/2010
CN    101902929    12/2010
(Continued)

OTHER PUBLICATIONS

European International Search Report,PCT/EP2011/051264, 2 pages, dated Oct. 10, 2011.
(Continued)

*Primary Examiner* — James C Yager
(74) *Attorney, Agent, or Firm* — Kilpatrick Townsend & Stockton, LLP

(57) ABSTRACT

The invention relates to a laminar structure (10) providing adaptive thermal insulation, comprising a first layer (22), a second layer (24), at least one cavity (16) provided in between the first layer (22) and the second layer (24), a gas generating agent (18) having an unactivated configuration and an activated configuration, the gas generating agent (18) being adapted to change from the unactivated configuration to the activated configuration, such as to increase a gas pressure inside the cavity (16), in response to an increase in temperature in the cavity (16), the first layer (22), the second layer (24) and the cavity (16) being arranged such that a distance (D) between the first layer (22) and the second layer (24) increases in response to the increase in gas pressure inside the cavity (16).

41 Claims, 16 Drawing Sheets

(51) Int. Cl.
*A41D 31/00* (2006.01)
*B32B 5/26* (2006.01)

(56) References Cited

U.S. PATENT DOCUMENTS

| | | | |
|---|---|---|---|
| 4,194,041 | A | 3/1980 | Gore et al. |
| 4,493,870 | A | 1/1985 | Vrouenraets et al. |
| 6,261,678 | B1 | 7/2001 | Von Fragstein et al. |
| 7,396,784 | B2 * | 7/2008 | Thiriot ............... A41D 31/0022 428/920 |
| 2005/0050619 | A1 | 3/2005 | Dunn |
| 2007/0023740 | A1 * | 2/2007 | Michael .................. A62D 1/00 252/601 |
| 2008/0282455 | A1 * | 11/2008 | Jones .................. A62B 17/003 2/458 |
| 2009/0111345 | A1 | 4/2009 | Panse et al. |
| 2011/0293958 | A1 * | 12/2011 | Benkoski ........... C08G 18/3228 428/560 |

FOREIGN PATENT DOCUMENTS

| | | |
|---|---|---|
| EP | 0689500 | 9/1994 |
| EP | 1 579830 | 9/2005 |
| EP | 01894482 | 3/2008 |
| JP | 2000-212810 | 8/2000 |
| JP | 2000-328323 | 11/2000 |
| JP | 2001-214318 | 8/2001 |
| JP | 2009-280942 | 12/2009 |
| JP | 2010-528893 | 8/2010 |
| JP | 2010-255129 | 11/2010 |
| RU | 2067402 | 10/1996 |
| RU | 2156100 | 9/2000 |
| WO | WO99/05926 | 2/1999 |
| WO | WO2008/097637 | 8/2008 |
| WO | WO2009/025892 | 2/2009 |

OTHER PUBLICATIONS

Esser-Kahn et al., "Triggered Release from Polymer Capsules", Macromolecules 2011, 44, 5539-5553.

* cited by examiner

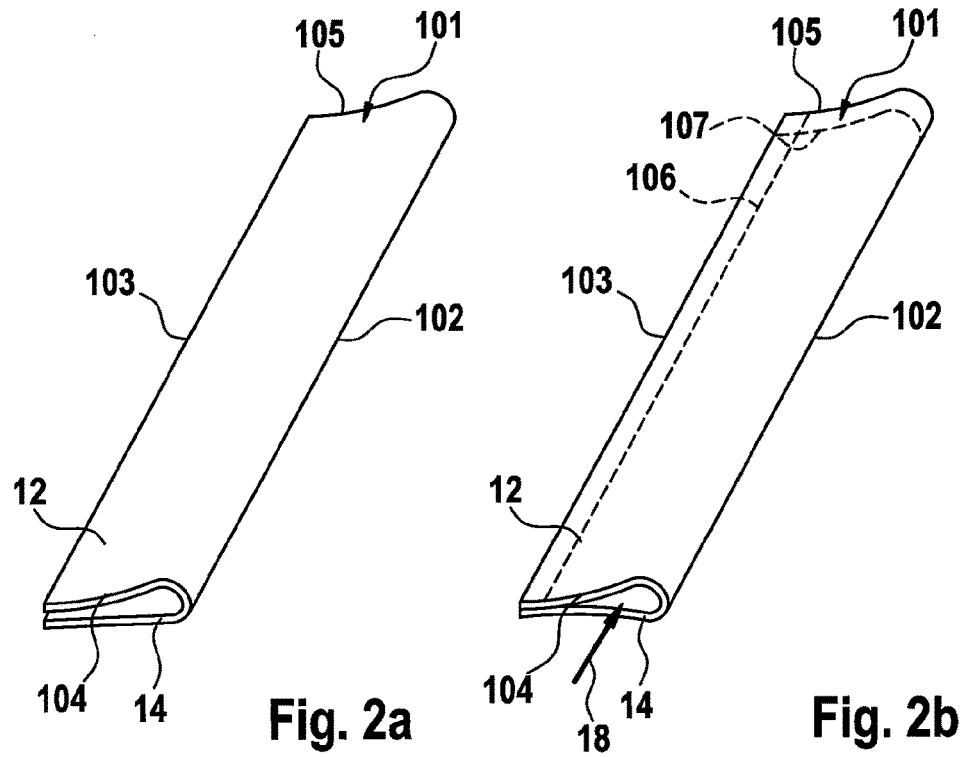
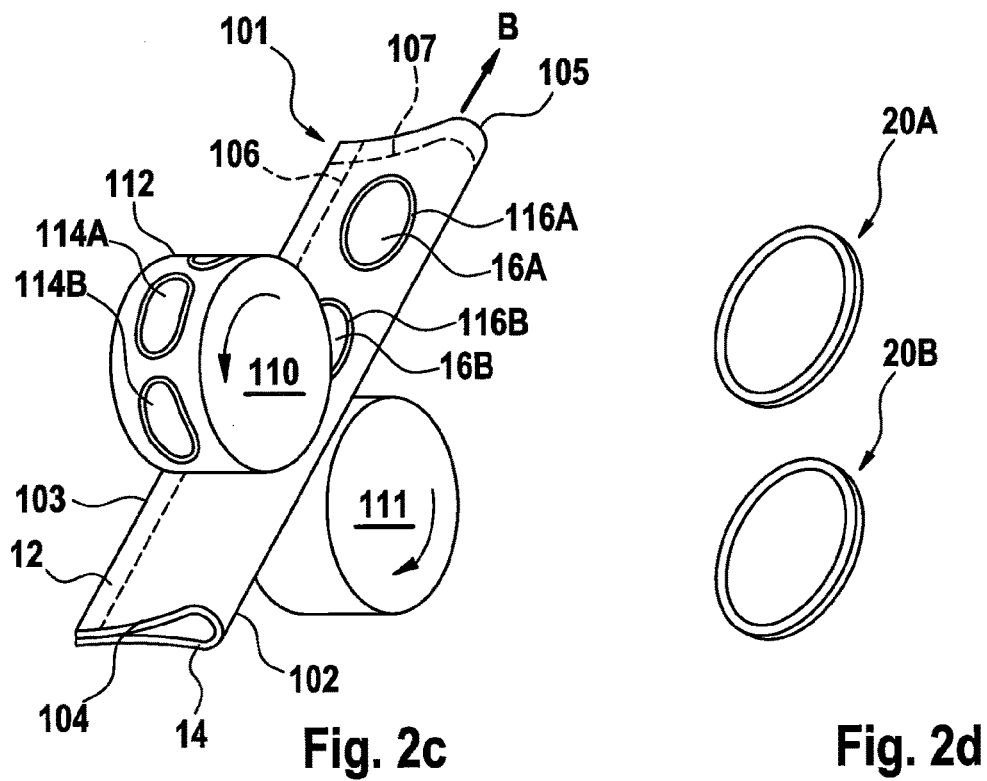

LAMINAR STRUCTURE PROVIDING ADAPTIVE THERMAL INSULATION

The present invention relates to structures providing adaptive thermal insulation, and in particular relates to a laminar structure providing adaptive thermal insulation. Such laminar structure may be used in the design of fabrics or textiles, in particular in applications for personal protective equipment, e.g. garment, like protective garment or other functional garment like gloves.

Protective garment or functional garment is typically used in applications, like fire fighting, law enforcement, military or industrial working, where protection of the wearer against environmental influence is required, or where it is required to provide desired functional characteristics under given environmental conditions. The garment may be required to protect a wearer against heat, flame, or impact by liquids. It is typically desired that the garment provides sufficient comfort for the wearer that he is able to do the work he is supposed to do.

To mention fire fighter's garment, as one application where protective garment or functional garment is used, such garment is required to provide, on the one hand, a significant degree of thermal insulation against flame and heat. This requires the garment to efficiently suppress heat transfer through the garment from the outside to the inside. On the other hand, fire fighter's garment is required to provide sufficient flexibility and breathability to allow the fire fighter to do his work efficiently while wearing the garment. This requires the garment to allow to some degree water vapor transfer (breathability) through the garment from the inside to the outside.

Thermal insulation to be provided by fire fighter's garment is required to be effective under a wide range of environmental temperatures: To mention an extreme case, fire fighter's garment is required to provide sufficient thermal insulation to protect a fire fighter when exposed to a "flashover" of flames in a fire where environmental temperatures may be about 1000° C. and higher. In such case the garment will, at least temporarily, be exposed to a temperature at the outer shell of the garment of about 800-900° C. In case of severe fires, still the outer shell of the garment is expected to be at temperatures up to about 350° C. when the fire fighter has to approach flames closely. The temperatures at the skin of the fire fighter should be reduced to an increase in no more than about 24° C.

In technical non fire related tasks the traditional fire fighter garment offers a level of thermal performance which is usually not needed and leads to low comfort (like low breathability of the garment) due to thick and heavy garment layers. In applications like the fire fighter's garment mentioned above, where the garment is required to provide for a wide range of thermal insulation, it is typically difficult to meet all requirements by static structures, i.e. by structures providing thermal insulation, as required in a worst case scenario, for all time.

A number of dynamic concepts have been suggested. The idea behind such dynamic concepts is to create a structure that provides different degrees of thermal insulation according to given environmental conditions. The thermal insulation provided may adapt to environmental temperatures as experienced by the structure, on its outer side and/or on its inner side.

In the field of fire protection the concept of intumescent systems has been developed and is used in a variety of applications, e.g. in intumescent gaskets for fire doors, or in the form of intumescent coatings for pipes. Such intumescent systems typically involve an intumescent substance having a solid body that is subject to a foaming process under exposure to heat, thus increasing the volume and therefore the insulative property. Usually such foaming process starts when the intumescent substance is subject to a predetermined activation temperature. As a result of the foaming process, the intumescent substance becomes porous, i.e. reduces its density and increases its volume, but still remains to have a solid structure. Typical intumescent substances are sodium silicate, expandable graphite or materials containing carbon and significant amounts of hydrates.

It has been suggested to use intumescent materials for producing fire fighter's garment or other functional garment. US 2009/0111345 A1 discloses a structure providing adaptive insulation for waterproof water vapor permeable fabrics/garments to protect the wearer from heat or flame while maintaining breathability. An intumescent substance based on a polymer resin-expandable graphite mixture is positioned in between a flame barrier and a liquid-proof barrier. US 2009/0111345 A1 specifies an activation temperature of about 200° C. and a volume increase of the intumescent substance of at least 200% after exposure to 300° C. for 90 s. Tests have shown that this approach when applied to fabrics of fire fighter's garment has limitations.

A further approach for manufacturing a flame retardant flexible material that provides thermal protection through an intumescent mechanism is shown in WO 2009/025892 A2. In this material a plurality of discrete guard plates are affixed to an outer surface of a flexible substrate fabric in a spaced relationship to each other. The guard plates include an intumescent material which significantly expands upon exposure to sufficient heat. Thereby a continuous thermally insulating and flame retardant outer shell film is formed upon activation. In an embodiment, the guard plates include heat expandable microcapsules that include water or a water based solution which evaporates upon exposure to heat, thereby absorbing heat from the flame source and expanding the microcapsules until they rupture and release their content to drive oxygen away and quench the flame. Activation temperatures of the water-encapsulating microcapsules are reported to be about 100° C.-400° C.

As alternative to intumescent systems, it has been suggested to provide adaptive thermal insulation for fire fighter's garments using shape memory alloy material or bi-metallic material, see WO 99/05926 A1. According to this approach a dynamic, thermally adaptive, insulation system is based on a spacer material arranged in between an outer shell fabric and an inner liner fabric. The spacer material may be a shape memory alloy trained in helical shape, trough shape, or coil shape, or may be bi-metallic strips or snap disks. Activation temperatures of about 65° C.-75° C. (shape memory alloy), and 50° C. (bi-metallic strips) are reported. In contrast to the suggestions based on intumescent systems discussed above, WO 99/05926 A1 in principle provides for a reversible system that can run through a plurality of activation/deactivation cycles.

WO 2008/097637 A1 discloses a composite fabric system having a thermal barrier comprising an outer shell fabric, a moisture barrier and a thermal liner. The thermal liner comprises at least one thermally expanding flame resistant fabric made from crimped, heat resistant fibers held in a state of compression by a thermoplastic binder in an unactivated condition. When the thermal liner is exposed to heat or flame, the liner is reported to increase its thickness by at least three times.

The invention aims in providing an improved laminar structure allowing adaptive thermal insulation with respect to high temperatures. In a particular application, the invention aims in providing a fabric for use in protective and/or functional garment, particularly for use in fire fighter's garment, said fabric including such improved laminar structure.

The invention provides for a laminar structure providing adaptive thermal insulation, comprising a first layer; a second layer; at least one cavity provided in between the first layer and the second layer; a gas generating agent having an unactivated configuration and an activated configuration; the gas generating agent being adapted to change from the unactivated configuration to the activated configuration, such as to increase a gas pressure inside the cavity, in response to an increase in temperature in the cavity; the first layer, the second layer and the cavity being arranged such that a distance between the first layer and the second layer increases in response to the increase in gas pressure inside the cavity.

The invention provides an adaptive thermal insulation structure that increases its thermal insulation capability in response to increase in temperature. It has been demonstrated recently that such structure may show a distinct increase in thermal insulation capability when temperature increases from a range of normal or operation temperatures to a range of elevated temperatures. In some embodiments a distinct increase from a first (usually lower) thermal insulation capability at lower temperatures to a second (usually larger) thermal insulation capability at higher temperatures can be obtained. In preferred embodiments the distinct increase in thermal insulation capability may be associated with an activation temperature, i.e. the structure is activated when temperature increases to the activation temperature or above.

Laminar structure as used herein defines a structure having, at least in the unactivated condition of the structure, a planar or sheet like configuration extending essentially in lateral directions, as defined by length and width directions, and being thin. A configuration is considered thin if it has a thickness in the direction orthogonal to length and width directions that is much smaller than length and width. In typical applications, the laminar structure as defined herein will be a flexible laminar structure with respect to bending, or a rigid laminar structure.

The first and second layers may be layers arranged such as to face each other in a thickness direction of the laminar structure. The first and second layers do not necessarily need to be adjacent layers. Besides the cavity, other structural elements of the laminar structure, e.g. insulating material, may be interposed in between the first and second layers. The first and second layers will usually extend essentially parallel to each other and orthogonal to the thickness direction. Distance between the first and second layers can be measured in thickness direction. In case the first and/or second layers are not in the same plane, but have a structure with embossments and/or depressions, distance between the layers is meant to refer to a given reference plane. In practical implementations, the first and second layers may e.g. be layers of a fabric, e.g. a first fabric layer and a second fabric layer, with the cavity being sandwiched in between the first layer and the second layer. The first and second layer may be referred to as inner layer and outer layer, respectively. In applications of the inventive laminar structure to fabrics used in garment, the term "inner layer" means a layer that is directed to the body of the wearer and typically is arranged as close as possible to the skin of the wearer, whereas the term "outer layer" means a layer directed away from the body of the wearer to the environment.

When being subject to increasing temperature, the gas generating agent will start to produce gas in the cavity, and hence gas pressure in the cavity will increase. Increasing gas pressure inside the cavity leads to an "inflation" of the cavity. As a result of the inflation, the cavity increases its thickness, and thereby increases the distance between the first layer and the second layer. The result is a "gas layer" or "air layer" (air entering into the space between the first and the second layers) being formed in between the first layer and the second layer, which provides for efficient thermal insulation because of the low thermal conduction of gas/air, and because of the increased distance between the first and the second layer).

The gas generating agent is the "driver" for movement of the first and second layers away from each other, in order to increase the distance in between the first and second layers and to increase an insulating volume. Depending on temperature, the gas generating agent may have an unactivated configuration and an activated configuration. In the unactivated configuration of the gas generating agent the adaptive thermal insulation structure is in its unactivated condition. The activated condition of the adaptive thermal insulation laminar structure is obtained by the change of the configuration of the gas generating agent. The gas generating agent, in the unactivated configuration, may be included in the cavity. The gas generating agent may be any of a liquid, a solid, or a gel, or combinations thereof. The gas generation may occur via a physical transformation (i.e. a phase transition from liquid to gas and/or from solid to gas and/or release of adsorbed gases), or via a chemical transformation (i.e. a chemical reaction releasing at least one gaseous product), or by combinations thereof. It has been found that a desired activation threshold of the gas generating agent, e.g. an activation temperature, can be adjusted suitably well by providing the gas generating agent in the form of a mixture of at least two compounds. As an example a liquid gas generating agent having a desired boiling temperature can be provided by mixing two or more "pure" liquids.

According to the invention, the cavity and the gas generating agent form a thermally activated, inflatable composite structure that, when subject to increased temperature, increases its volume. The invention thus provides for an effect resembling the behavior of intumescent substances when subject to increased temperature, but uses a process entirely different from intumescence. In the laminar structure described herein the cavity and the gas generating agent are configured in such a way that the increase in volume of the cavity leads to a pronounced increase in distance between the first and second layers. Thereby an insulating volume filled essentially by air and/or gas is created in between the first and second layers. Different from known intumescent substances which change configuration from a compact solid structure into a porous solid structure with increasing temperature, the "quasi-intumescent" composite structure according to the invention changes its configuration from an uninflated condition at lower temperatures to an inflated condition at higher temperatures. In contrast to known intumescent substances where a foaming process is started after activation and with the result that a vast plurality of individual cavities are formed, the invention provides for a cavity of predetermined geometry already present in the unactivated condition. After activation this cavity changes its shape such as to increase volume and to increase the distance in between the first layer and the second layer.

The inventors have found that such a "quasi-intumescent" composite laminar structure can be much better adjusted and controlled in terms of its activation temperature and the rate of activation (i.e. rate of increase in thermal insulation capability with increase in temperature when temperature has reached the activation temperature) than any known intumescent substances. Moreover, it has been shown that even reversible "quasi-intumescent" composite laminar structures can be produced, which allow to reset the system from an activated condition into an unactivated condition, even in a plurality of cycles if desired.

The gas generating agent, which in the unactivated configuration, may be included in the cavity, may be adapted to generate gas in the cavity in response to the temperature in the cavity exceeding a predetermined activation temperature, such that the distance between the first layer and the second layer increases from a first distance in the unactivated configuration of the gas generating agent to a second distance in the activated configuration of the gas generating agent.

Activation temperature is meant to be a temperature at which the gas generating agent starts to produce a significant amount of gas in the cavity, the gas pressure in the cavity starts to increase and such increasing gas pressure inside the cavity leads to a volumetric increase ("inflation") of the cavity.

The second distance between the first layer and the second layer in the activated configuration of the gas generating agent may be larger by 1 mm, or more, than the first distance between the first layer and the second layer in the unactivated configuration of the gas generating agent. In particular embodiments the second distance may larger than the first distance by 3 mm, or more, or may even be larger by 6 mm, or more.

In an embodiment, the laminar structure may further comprise at least one envelope enclosing the at least one cavity. Particularly, the envelope may be configured such that a volume of the cavity increases in response to the increase in gas pressure inside the cavity.

An envelope enclosing the cavity with the gas generating agent being included in such cavity, as described above, is considered to be an inventive contribution on its own. Such envelope may be used to provide adaptive thermal insulation to a wide range of laminar structures, including textile laminar structures used to produce garments. Envelopes of the type described may even be used to provide adaptive thermal insulation functionality to existing laminar structures, for example those used with garments, or to improve the thermal insulation functionality of existing conventional laminar structures, e.g. those used with garments. Therefore, in another aspect the invention provides an envelope adapted to be used with a laminar structure providing adaptive thermal insulation, the envelope enclosing at least one cavity having included therein a gas generating agent having an unactivated configuration and an activated configuration, the gas generating agent being adapted to change from the unactivated configuration to the activated configuration, such as to increase a gas pressure inside the cavity, in response to an increase in temperature in the cavity, the envelope being configured such that a volume of the cavity increases in response to the increase in gas pressure inside the cavity.

In a preferable embodiment, the envelope is configured such as to enclose the cavity in a fluid tight manner.

The envelope may be fluid-tight in such a way as to prevent at least in the unactivated condition of the laminar structure a leakage of gas generating agent in the form of a fluid out of the cavity. A fluid is a substance that flows under an applied shear stress. Fluids are a subset of the phases of matter and may include liquid phases, gaseous phases, plasmas and plastic solid phases, including mixtures thereof. A fluid may also include subcritical or supercritical phases. Thus, the envelope is considered to be essentially impermeable to the gas generating agent, at least with respect to the unactivated configuration of the gas generating agent.

Fluid tightness of the envelope according to a first aspect is relevant with respect to considerably long timescales of months or even years. An example how to test fluid tightness according to the first aspect is described below.

In a second aspect, the envelope may be even fluid-tight with respect to gas generated from the gas generating agent when being activated. Such fluid tightness, being provided at least temporarily for the time the laminar structure is activated, allows for activation of the laminar structure without significant loss of gas generating agent. The better the fluid tightness of the envelope according to the second aspect is the larger will be the number of activation/deactivation cycles that can be obtained for the laminar structure with a reversible gas generating agent.

It is not absolutely necessary that the envelope comprises, at least in part, a stretchable or elastic material. Surprisingly, a sufficiently large increase in the volume of the envelope can even be obtained in case the envelope is made of a non-stretchable material with respect to being subject to gas pressure produced in the cavity in the activated configuration of the gas generating agent.

The advantage of using a non-stretchable material for the envelope is that much more robust materials are available that allow to maintain fluid tight properties even after a number of activation/deactivation cycles. Furthermore it turned out that the size of the envelope in the activated configuration is better controllable with a non-stretchable material.

The term "non-stretchable" is to be understood in the sense that the material from which the envelope is made does not significantly elongate in any direction when being subject to increased gas pressure inside the envelope after activation. An increase in distance between the first and the second layer and/or an increase in volume of the envelope may result in changing the shape of the envelope from a "flat shape" towards a "convex shape". Such change in shape is due to the tendency of the cavity to increase its volume for given surface area of the envelope under the gas pressure created as more and more gas generating agent changes from the unactivated configuration to the activated configuration. This process leads to an increase in mean thickness or height of the cavity, and thereby increases the distance between the first and the second layers.

In a particular embodiment, the envelope may be made of a temperature resistant material with respect to a range of temperatures in the cavity in the activated configuration of the gas generating agent.

The term "temperature resistant" is understood to specify that the material is able to withstand a loading temperature, which is higher than the activation temperature by a predetermined temperature increase, e.g. by an increase of 10° C., for a predetermined time. Typically the temperature is 10° C. above the activation temperature, and the time is 1 minute or longer. The required temperature resistant properties depend on the application of the laminar structure, e.g. on the position of the laminar structure in a garment with respect to other layers in the garment. The more the laminar structure will be located towards the source of a heat, the higher will be the requirements for the temperature resistance. In one embodiment the temperature is at least 10° C. above activation temperature for 1 minute. In another embodiment the temperature is 50° C. above activation temperature for 2 minutes. In a preferred embodiment for fire fighter applications the temperature is around 150° C. above activation temperature for 2 minutes.

The envelope may be made up of a single piece, or may be made up of several pieces that are bonded together.

In an embodiment the envelope may have a composite structure of a plurality of envelope layers attached to each other. In one embodiment the envelope layers may be bonded together by lamination, either bonded in discrete areas or bonded over the entire areas thereof. Two or more layers may be laminated onto each other. In an envelope having such layered structure, it will be sufficient if at least one layer of said layered structure provides for fluid tightness and therefore forms a fluid tight layer.

In another embodiment the envelope layers may made of a fluid tight single layer (monolayer). Said layer might be formed to the envelope by welding or gluing.

In some embodiments the envelope may be made of at least two envelope pieces. The at least two envelope pieces may be bonded together such as to enclose the cavity in between. In such configuration, preferably each of the envelope pieces provides for fluid tightness, as desired, and each two adjacent envelope pieces are bonded together in a fluid tight manner. Fluid tightness should be provided with respect to the unactivated configuration of the gas generating agent (see first aspect of fluid tightness above), but preferably fluid tightness is also maintained, at least for a predetermined time, with respect to the activated configuration of the gas generating agent (see second aspect of fluid tightness above). Preferably the fluid tightness of the envelope is maintained even after a plurality of activation/deactivation cycles.

A number of materials may be used to form a fluid tight layer, materials that include but are not limited to, like metals or alloys (aluminium; gold; iron; mild steel; stainless steel; iron based alloys; aluminium based alloys; brass), polymers (polyolefins like polyethylene (PE), polypropylene (PP); polyvinylchloride (PVC); polystyrole (PS); polyester (e.g. polyethylene terephtalate PET); polycarbonate; polyimide; polyether ether ketone (PEEK); polytetrafluoroethylene (PTFE); polychlorotrifluoroethylene (PCTFE); ethylene chlorotrifluoroethylene (ECTFE); polyvinylidene fluoride (PVDF)), glass, ceramics, nanomaterials (organically modified ceramics, e.g. Ormocers®), inorganic organic nanocomposites). The fluid tight layer may be formed of a plurality of single monolayers of any of the materials mentioned before, or any combination of these materials, in order to obtain a desired fluid tightness. In general the fluid tight layer will be thin with a thickness of 2 mm or below, in order to have sufficient flexibility. In a preferred embodiment the fluid tight layer has a thickness of less than 1 mm.

An additional sealing layer may be applied to the fluid tight layer at least on one side thereof, e.g. by calendering. The sealing layer may include a thermoplastic polymer (e.g. polyurethane (PU); PP; PE; polyester). The sealing layer may improve the fluid tightness of the fluid tight layer and may allow welding of two envelope pieces together to generate the fluid tight envelope. To enhance the adhesive characteristics of the fluid tight layer, a pretreatment of the layer surfaces, e.g. by corona discharge, plasma discharge, primers, can be used. Possible welding methods include heat sealing, ultrasonic welding and microwave welding.

In a further possible embodiment, one or a plurality of glue beads e.g. made from a thermoplastic glue, silicones, contact adhesives, reactive glue systems is applied to at least one of the surfaces of the fluid tight layer to be bonded, and then the other surface is attached to the glue bead.

As an example, the envelope may be made of a metal/plastics composite material.

In one embodiment an aluminum/plastics composite material is used for forming the envelope. Such a composite may comprise a polyethylene terephtalate (PET)-layer, an aluminium (Al)-layer and a polyethylen (PE)-layer. A reasonable thickness range for the Al-layer is between 4 µm and 25 µm. Such a composite has shown in one embodiment to be sufficiently fluid tight if the Al-layer has a thickness of at least 12 µm. In a further embodiment of the invention the Al-layer can comprise one or more than one Al sheets. In the case of more than one Al-sheets, the sheets are attached to each other to form one single Al-layer. The attachment of the several Al-sheets might be done in using continuous adhesive polymer sheets to bond the Al sheets together. In another embodiment the Al sheets can be formed using a vapor deposition process. The PE-layer may be used as sealing layer by which adjacent envelope layers can be bonded fluid tightly together in specific areas in order to create the envelope. The thickness of the PE-layer can be between 20 µm and 60 µm. A preferable thickness is about 40 µm. The PET-layer may be used as a cover layer to provide for desired characteristics of the outer surface of the envelope. In one example a 12 µm thick PET-layer may be used. The composite layer structure as described before may be obtained by the company Kobusch-Sengewald GmbH, Germany.

Other possible composite layers for forming the envelope include, but are not limited to:
a layered composite structure formed with:
PET/aluminium/polypropylene (sealing layer) (available under the tradename: Flexalcon® by the company Alcan Packaging GmbH, Germany)
a layered structure formed with:
PET/adhesive/aluminium/adhesive/copolymer/polyethylene (available under the tradename: Tubalflex® by the company Alcan Packaging GmbH, Germany)

In an embodiment the gas generating agent in the unactivated configuration may have the form of a liquid. In that case the activation temperature of the adaptive thermal insulation laminar structure may correspond to the boiling temperature of the gas generating agent.

In another embodiment a solid or gel may be used as gas generating agent. Such solid is preferably in the form of a powder which provides for large surface area. A gel is a compound having functional groups embedded therein according to chemical and/or physical bonding mechanisms (e.g. chemical mechanisms like covalent bonding or physical mechanisms like van der Waals-bonds, sterical bonding effects). Examples for gels are hydrogels. Gels may have a limited fraction of solids. A solid or a gel is easier to handle than liquid due to the requirement of fluid tightness of the envelope.

The activation of a liquid or solid gas generating agent may involve a physical transformation, namely a phase transition into gaseous phase. The gas generating agent may be in the form of a liquid, then vaporization of the gas generating agent takes place by activation. It is also possible to use a solid gas generating agent which is able to undergo sublimation into the gas phase.

It is not intended to transform thermal energy into latent heat, in order to slow down increase in temperature. Rather, it is intended to transform all thermal energy into an increase of the distance between first layer and second layer. In case the phase transition does not need to provide for latent heat, gas production in the cavity is fast, and hence a fast increase in the distance between the first layer and the second layer can be achieved at the activation temperature. This is particularly advantageous at low activation temperatures, since it has been found that fast activation rates can be obtained down to rather low activation temperatures of about 50° C. In a garment, therefore, the inventive laminar structure does not need to be located close to the outer side of the garment which is usually exposed to highest temperatures, e.g. in a flame. Rather, it is possible to locate the laminar structure more to the inner side of the garment, i.e. towards the skin of a wearer. Such an arrangement reduces the requirements concerning the thermal resistance of the materials used.

In an embodiment, the gas generating agent may have a non-significant enthalpy of vaporization or enthalpy of sublimation. The enthalpy of vaporization may be 150 J/g or even lower. In another embodiment the gas generating agent may have a low activation energy in case of physical desorption or chemical reaction.

In case of a fluid gas generating agent, the gas generating agent may have a boiling temperature below 200° C. In particular embodiments a boiling temperature between 30° C. and 100° C., preferably between 30 and 70° C., even more preferably between 40 and 60° C. and most preferably between 45° C. and 55° C. has been used. In a particular embodiment a fluid has been used with a boiling point at about 49° C. An example for such a fluid is a fluid comprising 1,1,1,2,2,4,5,5,5-nonafluoro-4-(trifluoromethyl)-3-pentanone $CF_3CF_2C(O)CF(CF_3)_2$ (available as "3M NOVEC® 1230 Fire Protection Fluid"). The enthalpy of vaporization of such fluid is about 88 J/g.

In some embodiments a fluid gas generating agent with one or more of the following characteristics may be used: freezing point of the liquid below room temperature; non flammable or ignition temperature above 200° C.; non hazardous; non or at least low toxicity; low ozone depletion potential; low global warming potential; high chemical and/or temperature stability. In the case thermal decomposition of the fluid occurs it is preferred that such thermal decomposition is reversible.

The gas generating agent may be selected from the group including, but not limited to, the following compounds or mixtures thereof: hydrochlorofluorocarbons; hydrofluoropolyethers; hydrofluoroethers; hydrofluorocarbons; hydrofluoroketones; perfluoro-analogies and the like. Typically such liquids are used for applications like heat exchangers, refrigeration, air conditioning, fire fighting, cleaning/cooling fluids in the electronic industry.

Examples for conceivable fluids are: Galden® HT55, Galden®SV55, Galden®ZV60, all available from Solvay Solexis; Novec® 1230 Fire Protection Fluid, Novec® 649 Engineered Fluid, Novec® HFE 7100, Novec® HFE 7200, Novec® HFE 7500, all available from 3M; Vertrel® XF 2,3-dihydrodecadifluoropentane available from DuPont; Asahiklin® AE, Asahiklin® AK, available from Ashahi Glass Company, Daikin HFC available from Daikin.

In a further embodiment the gas generating agent, in the unactivated configuration, may have the form of a liquid, a gel or a solid, and the activation temperature of the adaptive thermal insulation laminar structure will be a temperature which corresponds to the activation energy of a chemical reaction leading to release of at least one gaseous compound from the gas generating agent.

When gas generating agent is a solid or a gel, activation may more easily be achieved by a chemical process producing a compound that is released into the gaseous phase. A number of chemical reactions producing gaseous reaction products are known. Examples are: release of gaseous compounds embedded in a gel; soda-reaction; release of ammonia and hydrochloric acid from ammonium chloride. Preferable chemical reactions for releasing gaseous compound have kinetics with very steep increase in reaction rate at the activation temperature, and fast reaction rate.

To facilitate handling of the gas generating agent, in particular to facilitate placement of the gas generating agent in the cavity when manufacturing the envelope a dosing aid might be used. In one embodiment the envelope may include a dosing aid wherein the dosing aid extends into the cavity and has a portion to which the gas generating agent is applied, said portion being included in the cavity. The gas generating agent may be in many cases a substance that is difficult to handle, e.g. because of its viscosity, fugacity, stickiness and/or because it is hazardous. In such cases the use of a dosing aid will be helpful as it is much easier to handle than the gas generating agent alone. When the gas generating agent is activated it will increase the pressure in the cavity. Should the gas generating agent be deactivated at a later stage the gas generating agent may again collect at the dosing aid. This is, however, not absolutely necessary. It is conceivable that the gas generating agent, once re-converted into its unactivated configuration will be included in the cavity separate from the dosing aid.

The dosing aid may be made of a material that is able to absorb the gas generating agent in its unactivated configuration. Alternatively, the dosing aid may be made of a material that is able to adsorb the gas generating agent in its unactivated configuration. Typically, a dosing aid which absorbs the gas generating agent will allow a better handling of the gas generating agent during manufacture, as the gas generating agent is safely included in the structure of the dosing aid. However, it may happen that desorption of the gas generating agent is hindered or at least retarded. In such cases a dosing aid to which the gas generating agent adheres only at the surface may be beneficial.

In an embodiment, the dosing aid may be smaller than the cavity in the unactivated configuration of the gas generating agent, such that the dosing aid can be safely enclosed by the envelope enclosing the cavity.

In a further embodiment the dosing aid is welded together with the material of the envelope. In such a case the dosing aid may be made of a material that is able to support the formation of a fluid tight seal when being welded together with the material of the envelope. Such configuration of the dosing aid is beneficial as it allows the dosing aid to be sandwiched between and to be welded together with the layers that have to be bonded together to form a fluid-tight seal. As an example, the dosing aid may be provided as a sheet forming a weldable dosing aid layer.

In an embodiment, the envelope may include an intermediate layer separating the cavity into a first subcavity and a second subcavity. Such intermediate layer may be made of a fluid-tight material and may be configured to support the formation of a fluid tight seal when being welded together with the material of the envelope. The gas generating agent may be applied to one or both sides of the intermediate layer.

In a further embodiment an envelope structure may be provided, such envelope structure being formed by at least two envelopes bonded together. Such envelope structure allows an increase in distance between the first and second layers when the gas generating agent becomes activated. This particularly holds for a configuration in which the envelopes are bonded together at lateral ends thereof. The increase in thermal insulation capacity of a laminar structure can be enhanced very efficiently by providing such an envelope structure. Alternatively, to achieve a desired increase in thermal insulation capacity after activation, envelopes can be used that cover a smaller surface area of the laminar structure. Thereby, the breathability of the laminar structure can be increased efficiently.

The laminar structure may comprise a plurality of cavities and each of the cavities may be encased by a respective envelope. Preferably each of the envelopes is fluid tight. In such arrangement the envelopes will be arranged next to each other and with distance to each other.

Such an arrangement provides breathability of the laminar structure, especially in case the envelopes themselves are not water vapor permeable. Rather, breathability is maintained by spaces between the envelopes. Such spaces are formed at least in the unactivated condition of the laminar structure. In the activated condition the spaces between the envelopes preferably do not shrink much, since the envelopes are inflated only and do not substantially increase their surface area. Hence, breathability is maintained also in the activated condition of the laminar structure.

The envelope may have the form of a pad or chip, the pad or chip being flat in the unactivated condition and changing shape to the shape of an inflated pillow in the activated condition.

Breathability as used herein is understood to specify the characteristic of the laminar structure, or of a fabric or garment including such a laminar structure, to be able to transport water vapor from one side of the laminar structure to its other side. In one embodiment the laminar structure may be also water-tight in comprising at least one water-tight and water vapor permeable (breathable) functional layer. In one embodiment the first layer and/or the second layer comprises said functional layer. In another embodiment said functional layer forms an additional layer of the laminar structure. The functional layer can be realized using suitable membranes, e.g. microporous membranes made from expanded polytetrafluoroethylene (PTFE).

The term "water vapor permeable layer" as used herein is intended to include any layer which ensures a water vapor transmission through a layer or said laminar structure or layered composite. The layer might be a textile layer or a functional layer as described herein. The functional layer may have a water vapor permeability measured as water vapor transmission resistance (Ret) of less than 30 (m$^2$Pa)/W.

The water vapor transmission resistance or resistance-evaporation-transmission (Ret) is a specific material property of sheet-like structures or composites which determine the latent evaporation heat flux through a given area under a constant partial pressure gradient. A laminar structure, fabric composite, textile layer or functional layer according to the invention is considered to be water vapor permeable if it has a water vapor transmission resistance Ret of below 150 (m$^2$Pa)/W. The functional layer preferably has a Ret of below 30 (m$^2$Pa)/W. The water vapor permeability is measured according to ISO EN 11092 (1993).

The term "functional layer" as used herein defines a film, membrane or coating that provides a barrier to air penetration and/or to penetration of a range of other gases, for example gas chemical challenges. Hence, the functional layer is air impermeable and/or gas impermeable. The functional layer is in particular embodiments air impermeable, but it might be air permeable in other applications.

In a further embodiment the functional layer also provides a barrier to liquid water penetration, and ideally to a range of liquid chemical challenges. The layer is considered liquid impermeable if it prevents liquid water penetration at a pressure of at least 0.13 bar. The water penetration pressure may be measured on a sample of the functional layer based on the same conditions described with respect to the ISO 811 (1981).

The functional layer may comprise in one embodiment one or more layers wherein the functional layer is water vapor permeable and air-impermeable to provide air impermeable but water vapor permeable (breathable) characteristics. Preferably the membrane is also liquid impermeable, at least water impermeable.

A suitable water impermeable and water vapor permeable flexible membrane for use herein is disclosed in U.S. Pat. No. 3,953,566 which discloses a porous expanded polytetrafluoroethylene (PTFE) material. The expanded porous PTFE has a micro-structure characterized by nodes interconnected by fibrils. If desired, the water impermeability may be enhanced by coating the expanded PTFE with a hydrophobic and/or oleophobic coating material as described in U.S. Pat. No. 6,261,678.

The water impermeable and water vapor permeable membrane might also be a micro-porous material such as high molecular weight micro-porous polyethyllene or polypropylene, micro-porous polyurethane or polyester, or a hydrophilic monolithic polymer such as polyether polyurethane.

In a particular embodiment the laminar structure and/or the envelope may be configured to reversible change. In such embodiment the gas generating agent is configured to decompose or evaporate, and recombine or condensate again in response to a respective change in temperature. In an activation cycle, in response to an increase in temperature, the distance between the first layer and the second layer will increase from the first distance (in the unactivated configuration of the gas generating agent) to the second distance (in the activated configuration of the gas generating agent). In a deactivation cycle, in response to a decrease in temperature, the distance between the first layer and the second layer will decrease from the second distance (in the activated configuration of the gas generating agent) to the first distance (in the unactivated configuration of the gas generating agent). Such a sequence of activation cycle plus deactivation cycle may be repeated multiple times.

The envelope is intended not to rupture after activation, thereby the activation process is in principle reversible, and may be repeated multiple times. This requires a gas generation process that is in principle reversible and that the gaseous product(s) released remain within the cavity (i.e. the envelope should be, at least temporarily, gas tight with respect to the gases released). Typical examples for reversible gas generating processes are a physical phase transition of the gas generating agent (in the form of a pure compound or in the form of a mixture), or a sublimation process, e.g. sublimation of jodine. Another example for a reversible gas generating process is the reversible decomposition of e.g. ammonium chloride.

Preferably, the laminar structure and/or the envelope are flexible and have a "self-recovering capability". Thereby, in a deactivation cycle the envelope automatically recovers its original shape, i.e. its shape before activation of the gas generating agent started. No further mechanical action is necessary to support this process. The "self-recovering capability" of the envelope is supported by the fluid tightness of the envelope: In a deactivation cycle, the gas generating agent generally will increase its density when undergoing a transformation from the gaseous phase into the liquid phase. Hence the gas generating agent will occupy a much smaller volume in the unactivated configuration than in the activated configuration. In the absence of air flowing into the envelope during a deactivation cycle, the transformation of the gas generating agent will induce a contraction of the envelope into a (flat) shape in which it encloses a cavity of minimum volume. By such process also the distance between the first layer and the second layer will return to the original distance in the unactivated configuration of the gas generating agent.

The configuration of the laminar structure, as outlined above, allows for provision of macroscopic cavities enclosed by respective envelopes, which can be activated when subject to heat. Such envelopes may have the form of "pillows" or "pockets". The envelope may have in the unactivated configuration of the gas generating agent a lateral dimension of 1 mm or more. In particular embodiments the envelope may have a lateral dimension of 5 mm or more, preferably of 15 mm or more. Typically, the envelope may have a thickness dimension of less than 1 mm. Lateral dimension, as used in this context, refers to the smallest dimension of an envelope in a width/length plane. i.e. in a plane orthogonal to the thickness direction, which in general is the by far smallest dimension of an envelope in the unactivated configuration of the gas generating agent. Therefore, the lateral dimension basically defines the maximum increase in thickness which an envelope can reach in the activated configuration of the gas generating agent. A plurality of such flat envelopes may be used to form a flat laminar structure (as described above) which allows a high breathability of the laminar structure and therefore a higher comfort level for the wearer.

Expressed in term of volume increase, the cavity may have, in the activated configuration of the gas generating agent, a volume increase of between 10 and 1000 with respect to the volume in the unactivated configuration of the gas generating agent. Preferably the volume increase may be above 40.

In a still further embodiment the envelope enclosing the cavity may comprise an outer envelope and an inner envelope, the outer envelope enclosing an outer cavity, the inner envelope being located within the outer cavity and enclosing the cavity.

The laminar structure outlined above may be incorporated into a fabric composite structure. The term "fabric" refers to a planar textile structure produced by interlacing yarns, fibers, or filaments. The textile structure may be a woven, a non-woven, a fleece or combinations thereof. A "non-woven" textile layer comprises a network of fibers and/or filaments, felt, knit, fiber batts, and the like. A "woven" textile layer is a woven fabric using any fabric weave, such as plain weave, crowfoot weave, basket weave, satin weave, twill weave, and the like. Plain and twill weaves are believed to be the most common weaves used in the trade.

Such fabric composite structure typically will comprise a plurality of fabric layers arranged to each other. The plurality of fabric layers may include an outer heat protective shell structure having an outer side and an inner side. The plurality of fabric layers may also include the laminar structure providing adaptive thermal insulation, as described above.

In a particular embodiment, the laminar structure providing adaptive thermal insulation may be arranged on the inner side of the outer heat protective shell structure.

As an embodiment the outer heat protective shell structure denotes an outer layer of an article (such as a garment) that provides primary flame protection. The outer heat protective shell structure may comprise a flame resistant, thermally stable textile, e.g. a woven, knit or non-woven textile comprising flame resistant textiles like polyimides (meta-aramid, para-aramid) or blends thereof. Specific examples for flame resistant or thermally stable textiles comprise polybenzimidazole (PBI) fiber; polybenzoxazole (PBO) fiber; poly diimidazo pyridinylene dihydroxy phenylene (PIPD); modacrylic fiber; poly(metaphenylene isophthalamide) which is marketed under the tradename of Nomex® by E.I. DuPont de Nemours, Inc; poly(paraphenylene terephthalamide) which is marketed under the tradename of Kevlar® by E.I. DuPont de Nemours, Inc.; melamine; fire retardant (FR) cotton; FR rayon, PAN (poly acrylnitril). Fabrics containing more than one of the aforementioned fibers may also be utilized, (Nomex®/Kevlar®, for example). In one embodiment an outer shell layer made with woven Nomex® Delta T (textile weight of 200 $g/m^2$) is used.

Flame resistant materials are specified in international standard EN ISO 15025 (2003). DIN EN ISO 14116 (2008) specifies test methods for assessing flame resistance of materials. According to DIN EN ISO 14116 (2008), different levels of flame resistance are specified. As an example, flame resistant materials to be used for fire fighter's garments are required to pass the test procedures specified for level 3 in DIN EN ISO 14116 (2008). For other applications less strict criteria, as specified for levels 1 and 2, may be sufficient.

The fabric may also comprise a barrier structure. In one embodiment the barrier structure will be arranged on the inner side of the outer heat protective shell structure.

In particular applications, the barrier structure comprises at least one functional layer. Said functional layer may be water vapor permeable and water proof and comprising at least one water vapor permeable and water proof membrane.

The barrier structure is a component that serves as a liquid barrier but can allow moisture vapor to pass through the barrier. In garment, such as firefighter turn out gear, such barrier structures keep water away from inside the garment and thereby minimize the weight which the firefighter carries. In addition, the barrier structure allows water vapor (sweat) to escape—an important function when working in a hot environment. Typically, the barrier structure comprises a membrane laminated to at least one textile layer like a nonwoven or woven fabric. Membrane materials which are used to be laminated to at least one textile layer (also known under the term laminate) include expanded polytetrafluoroethylene (PTFE), polyurethane and combinations of those. Commercially available examples of such laminates include laminates available under the name CROSSTECH® moisture barrier laminates or a Neoprene® membrane on a nonwoven or woven meta-aramid fabric.

In one embodiment a barrier structure comprising a membrane of expanded PTFE (ePTFE) made as described in EP 0 689 500 B1 is used. The barrier layer may be adhered to a textile layer made of non-woven aramide textile (15% para-aramid and 85% meta-aramid) with a textile weight of 90 $g/m^2$. Such a barrier structure is commercially available under the name GORE-TEX® Fireblocker N. In another embodiment a barrier structure available under the name CROSSTECH®/Nomex® PJ moisture barrier is used. Such moisture barrier comprises an ePTFE film with a polyurethane layer attached to a polyamide textile (Nomex®IIIA) with a textile weight of 105 $g/m^2$. Other barriers may be used, e.g. as described in U.S. Pat. No. 4,493,870, U.S. Pat. No. 4,187,390, or U.S. Pat. No. 4,194,041.

Barriers other than moisture barriers are conceivable, e.g. barriers providing at least one functional layer that prevents permeation of gases and/or liquids like chemical compounds in the form of gases, liquids and/or aerosols, or like substances comprising biological material in the form of gases, liquids and/or aerosols. In particular embodiments such other barrier layers may also be breathable.

The barrier structure may be positioned in between the outer heat protective shell structure and the laminar structure that provides adaptive thermal insulation.

The fabric may be used in protective garment or functional garment typically used in applications, like fire fighting, law enforcement, military or industrial working, where protection of the wearer against environmental influence is required, or where it is required to provide desired functional characteristics under given environmental conditions. The garment may be required to protect a wearer against heat, flame, or impact by liquids. It is typically desired that the garment provides sufficient comfort for the wearer that he is able to do the work he is supposed to do.

In particular, it is intended that the fabric be adapted for use in a fire/heat protective garment.

Exemplary embodiments of the invention will be described in greater detail below taking reference to the accompanying drawings which show embodiments.

FIGS. 2a-2c show a way how to manufacture envelopes;

FIG. 2d shows a plurality of single envelopes;

FIG. 8a shows a simplified and schematic cross-sectional view of a fabric including a laminar structure as shown in FIG. 7a;

FIGS. 8b to 8g show other possible configurations of fabrics including the laminar structure providing adaptive thermal insulation according to the invention;

FIG. 9 shows a fire fighter's jacket including a fabric as shown in FIG. 8a;

Figure 1A:
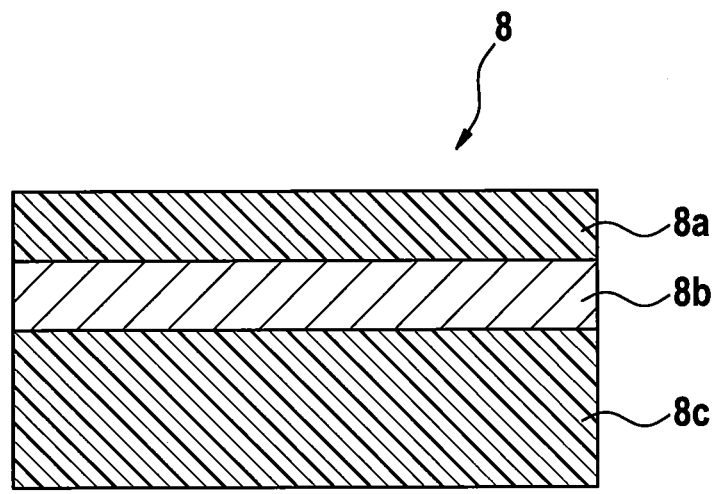
FIG. 1a shows a simplified and schematic cross-sectional view of a layer used to form an envelope in an embodiment.

In all Figs. components of respective embodiments being identical or having corresponding functions are denoted by the same reference numerals, respectively. In the following description such components are described only with respect to the first one of the embodiments comprising such components. It is to be understood that the same description applies in respective following embodiments where the same component is included and denoted by the same reference numeral. Unless anything is stated to the contrary, it is generally referred to the corresponding description of that component in the respective earlier embodiment.

FIG. 1a shows a simplified and schematic cross-sectional view of a layer 8 according to an embodiment. Such layer 8 may be used to prepare an envelope. The layer 8 is a laminate comprising a cover layer 8a, a fluid tight layer 8b and a sealing layer 8c. In one example the layer 8 made of an aluminum/plastics composite material comprising a polyethylene terephtalate (PET)-cover layer 8a, an aluminium (Al)-fluid tight layer 8b and a polyethylene (PE)-sealing layer 8c. In order to provide sufficient fluid tightness, a reasonable thickness range for the Al-layer 8b is between 4 µm and 25 µm. In the example shown the Al-layer 8b has a thickness of at least 12 µm. The PE-layer 8c is used as sealing layer by which adjacent laminate layers 8 can be bonded together fluid tightly, in order to create the envelope. The thickness of the PE-layer 8c can be between 20 µm and 60 µm. A preferable thickness is about 40 µm. The PET-layer 8a may be used as a cover layer to provide for desired characteristics of the outer surface of the envelope. In the example a 12 µm thick PET-layer 8a is used. The laminate layer 8 as described may be obtained by the company Kobusch-Sengewald GmbH, Germany.

Figure 1B:
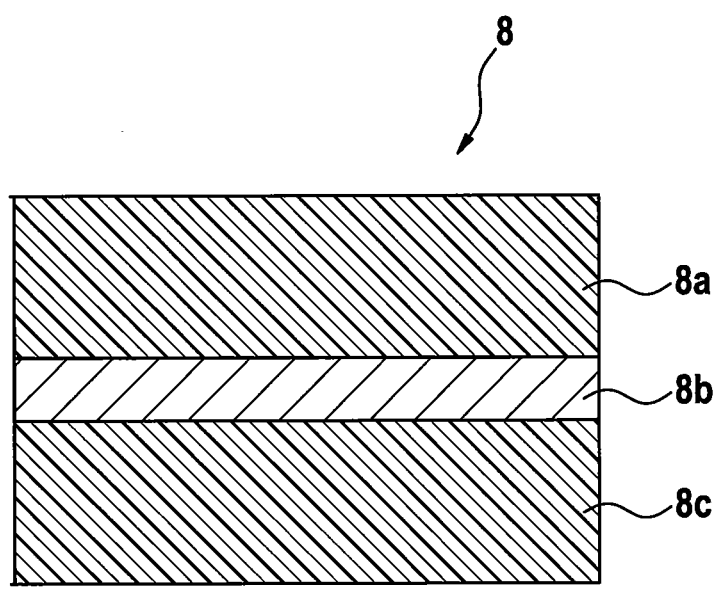
FIG. 1b shows a simplified and schematic cross-sectional view of a further layer used to form an envelope.

An alternative layer 8 for forming the envelope is shown in FIG. 1b. This layer 8 also is a laminate including a cover layer 8a made of PE with a thickness of 40 µm, an Al layer 8b with a thickness of at least 12 µm, and a PE sealing layer 8c with a thickness of 40 µm. In this embodiment the cover layer 8a is made of the same material as the sealing layer 8c. The cover layer 8a may be used as an additional sealing layer.

Figure 3A:
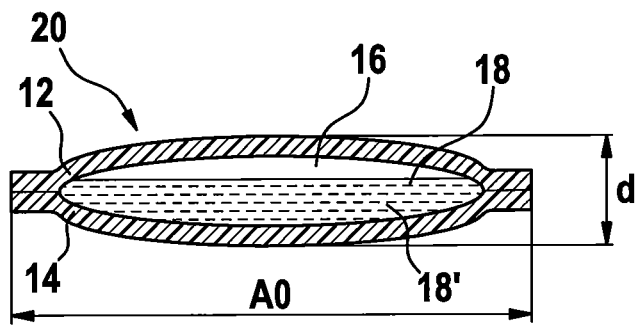
FIG. 3a shows a simplified and schematic cross-sectional view of an envelope enclosing a cavity which includes a gas generating agent, according to an embodiment, wherein the envelope laminate layers are welded to each other such as to form the envelope.

FIG. 3a shows a simplified and schematic cross-sectional view of an envelope (generally designated as 20) enclosing a cavity 16 which includes a gas generating agent (generally designated as 18). In FIG. 3a, as well as in each of FIGS. 3b, 3c, 3d, 4a, 4b,4c, the envelope 20 is shown in an unactivated configuration of the gas generating agent 18, and hence the envelope 20 has an uninflated, essentially flat shape, also referred to as the unactivated condition. In a flat configuration as shown in FIGS. 3a to 3d and FIGS. 4a to 4c, the envelope 20 has a dimension in thickness direction being significantly smaller than the dimensions of the envelope 20 directions orthogonal to the thickness direction, i.e. in lateral directions. Dimension of the envelope 20 in thickness direction is designated by d in FIGS. 3a-4c. Dimension of the envelope 20 in lateral direction is designated by A0 in FIGS. 3a to 4c. Here, A0 designates the length from one end of the weld to the end of the opposite weld of the envelope 20. In embodiments with a generally "round" or quadrangular shape of the envelope, dimensions A0 of the envelope may be substantially equal for all lateral directions. In other embodiments of the envelope with a generally elongate shape, dimension A0 in a width direction may be smaller than dimension A0 in a length direction.

In an embodiment the envelope 20 is made of two envelope layers 12, 14. Envelope layers 12, 14 may each have a configuration as the layers 8 shown in FIG. 1a or 1b. Particularly, although not explicitly shown, the envelope layers 12, 14 may be each made up of three layers, corresponding to the layers 8 depicted in FIG. 1a or FIG. 1b. The envelope layer 12 forms an upper part of the envelope 20, such upper part enclosing an upper part of cavity 16. The envelope layer 14 forms a lower part of the envelope 20, such lower part enclosing a lower part of cavity 16. In the embodiment shown, the envelope layer 12 and the envelope layer 14 have an identical configuration, e.g the configuration of the layer 8 shown in FIG. 1a. The envelope 20 has an innermost sealing layer, an intermediate fluid tight layer, and an outside cover layer.

Alternatively, the envelope 20 may be made up of two envelope layers 12, 14 configured from a layer 8 as depicted in FIG. 1b, or may be made up of one envelope layer 12 configured from a layer 8 as depicted in FIG. 1a and one envelope layer 14 configured from a layer 8 as depicted in FIG. 1b. Alternative materials, in particular monolayers or laminate layers of more or less complicated configuration, may be used for making the envelope 20, as outlined above, given the materials themselves are fluid tight and bonded together fluid tightly such that a fluid tight envelope 20 is produced. In one embodiment the envelope layers may made of a fluid tight single layer (monolayer). Said layer might be formed to the envelope by welding or gluing.

The envelope 20 encloses cavity 16 which is filled with gas generating agent 18. Gas generating agent 18 is chosen to be a liquid having a suitable equilibrium vapor pressure at room temperature. Room temperature is considered to define an unactivated configuration of gas generating agent 18. In the unactivated configuration of the gas generating agent 18 shown in FIG. 3a, gas generating agent 18 is substantially in its liquid phase designated by 18'. The envelope 20 provides a substantially fluid tight enclosure of cavity 16, and hence cavity 16 contains sufficient amount of gas generating agent 18, and the remaining volume of cavity 16 is filled with gas, in particular with a rest amount of air or other gas having been enclosed in cavity 16 at the time gas generating agent 18 was filled in. In the example disclosed, gas generating agent 18 is a fluid having the chemical formula $CF_3CF_2C(O)CF(CF_3)_2$. Such fluid is typically used for extinguishing fires and is commercially available under the trade name "Novec® 1230 Fire extinguishing fluid" from 3M. Other fluids may be used for the gas generating agent, as set out above.

A first method for producing an envelope 20 as shown in FIG. 3a is as follows:

First Sealing Step:

Two envelope layers 12, 14 made from a material according to FIG. 1a or 1b are put on top of each other, such that their respective sealing layers face each other. For forming a quadrangular envelope 20 a hot bar (sealing width: 2 mm) is brought into contact with the envelope layers 12, 14 such as to bring the sealing layers into contact and to weld the sealing layers together. This procedure is done for three of four sides of the quadrangular envelope 20. Thus an envelope 20 with one side open is formed.

Filling Step:

The envelope 20 is put onto a precision scale and the gas generating agent 18 is filled into the envelope, e.g using a syringe needle. The amount of gas generating agent to be filled in is controlled by the scale.

As an Example:

A quantity of 0.07 g gas generating agent 18 will be filled into the envelope 20, in case the envelope 20 has the following specification: the envelope 20 is formed from two envelope layers 12, 14 made up of PET/Al/PE as described above, outer size of the envelope 20 is 20 mm length and 20 mm width (corresponding to an inner size of the cavity of 16 mm length and 16 mm width), and gas generating agent 18 is selected as Novec® 1230.

Second Sealing Step:

After the filling step is finished the open side of the envelope 20 is closed by a fourth 2 mm sealing line. The envelope 20 is then cut precisely along the sealing line.

Correctness of the filling quantity for envelopes produced as outlined above can be measured as follows:

A predetermined quantity of envelopes 20 (e.g. 10 envelopes) is produced according to the first sealing step, each of these envelopes 20 is marked and weighed individually on a 4 digit scale (e.g. Satorius BP121S). A predetermined quantity of gas generating agent 18 in the form of a liquid is injected through a pipe from a gravity feed reservoir, including a time-triggered valve, through a syringe needle into the interior of the envelope. A predetermined time for valve opening is ensured by an adjustable electrical timer. Each envelope 20 is closed immediately by the second sealing step. Each of the filled envelopes 20 is weighed, and the weight of the empty envelope 20 (measured before filling) is subtracted. A maximum deviation of plus/minus 10% from the mean value of the sample set should be achievable.

A second method for producing an envelope 20 according to FIG. 3a is shown in FIGS. 2a to 2d, and is as follows:

First Step (FIG. 2a):

An elongate sheet, e.g. sheet being 65 mm wide and 1.3 m long, made from a laminate material 8 according FIG. 1a is used. Alternatively, a sheet of different size and/or made from another laminate material, e.g. made from a laminate material 8 as shown in FIG. 1b, may be used. The sheet is folded along its long side in such a way that the cover layer 8a of the laminate 8 (see FIG. 1a or FIG. 1b) is located outside, and the sealing layer 8c is located inside. Thereby, an upper envelope layer 12 and a lower envelope layer 14 are formed in such a way that the sealing layers of the envelope layers 12, 14 are facing each other. In this way a pre-envelope 101 is created. The pre-envelope 101 has a width of 32.5 mm and a length of 1.3 m. The pre-envelope 101 is closed at its one long side 102 and is open along its opposite long side 103. Both short sides 104 and 105 of the pre-envelope 101 are open.

Second Step (FIG. 2b):

A rotating ultrasonic welding wheel (e.g. 5 mm wide) is brought into contact with the pre-envelope 101 at the open long side 103, such as to bring the two sealing layers of the envelope layers 12, 14 into contact with each other. The sealing layers are welded together continuously along a sealing line 106 extending parallel to the open long side 103 of the pre-envelope 101. Thereby the long side 103 is closed and the pre-envelope 101 has a tubular shape with two open short sides 104, 105. A hot sealing bar (sealing width: 2 mm) is brought into contact with the pre-envelope 101 at one of the shorter sides 105, such as to bring the sealing layers into contact with each other. The sealing layers are welded together along a sealing line 107 extending parallel to the shorter side 105 such as to close the pre-envelope 101 at the shorter side 105. The pre-envelope 101 then has a shape of a tube with one end closed.

Then, holding open short side 104 higher than closed short side 105, gas generating agent 18 is filled into the open tubular pre-envelope 101 via the open short side 104. As an example, for a pre-envelope 101 as described and forming a cavity with inner size of 23 mm in width and 1 m in length, the pre-envelope 101 being made of a laminate layer 8 made up of PET/Al/PE, as described above and shown in FIG. 1a, and for a gas generating agent 18 being a liquid known as Novec® 1230, as described above, a quantity of 4 ml of gas generating agent 18 is filled into the pre-envelope 101.

Third Step (FIG. 2c)

The pre-envelope 101 is held with its open short side 104 facing upwards, and is held in an up-right position, such that the gas generating agent 18 filled in the cavity concentrates at the closed shorter side 105 of the pre-envelope 101. Starting from the closed shorter side 105, the pre-envelope 101 is brought into intimate contact with a second rotating ultrasonic welding wheel 110. Welding wheel 110 is part of an ultrasonic welding machine having a pair of welding wheels 110, 111. The welding wheel 110 has a circumferential face 112 formed with a plurality of circumferential seal contours 114A, 114B, . . . . Each of the seal contours 114A, 114B, . . . has a shape corresponding to the shape of the sealing line of the envelopes 20A, 20B, . . . to be produced (FIG. 2d). In this configuration welding wheel 111 has a planar circumferential surface.

The pre-envelope 101 is transported through the pair of welding wheels 110, 111 starting with its short closed side 105, see arrow B in FIG. 2c indicating the direction of movement of the pre-envelope 101. In this way the welding wheel 110 first contacts first the closed short side 105 of the pre-envelope 101 and finally contacts the open short side 104 of pre-envelope 101.

When the welding wheel 110 contacts the pre-envelope 101, the gas generating agent 18 is pushed away by the rotating ultrasonic welding wheels 110, 111 in areas where one of the sealing contours 114A, 114B, comes into contact with the pre-envelope 101, since in such areas the sealing layers are brought into contact with each other and are welded together. In this way, a closed sealing contour 116A defining the sealing portions of the final envelope 20A (FIG. 2d) is formed in the pre-envelope 101.

As the pre-envelope 101 travels through the gap between the rotating welding wheels 110, 111 a plurality of consecutive sealing contours 116A, 116B, . . . are formed in the pre-envelope 101. Each sealing contour 116A, 116B, . . . encloses a respective cavity 16A, 16B, . . . filled by a predetermined amount of gas generating agent 18.

It has been found that, following the procedure described above, each cavity 16A, 16B, . . . formed in pre-envelope 101 can be filled by the approx. same predetermined amount of gas generating agent 18. Particularly good reproducible results can be obtained by using an ultrasonic welding tool, e.g. in the form of a pair of ultrasonic welding wheels 110, 111, to produce the sealing contours 116A, 116B, . . . in the pre-envelope 101.

In one example having dimensions as outlined above 40 filled sealing contours 116A, 116B, . . . , each having outer dimensions of 20 mm width and 23 mm length and a cavity size of 16 mm width and 18 mm length, can be created.

Fourth Step (FIG. 2d):

Finally, the final pre-envelope 101 having sealing contours 116A, 116B, . . . formed therein, is cut, e.g. using a hand operated or automated standard dye cut machine with a cutting dye having the shape of the outer dimensions of the sealing contours 116A, 116B, . . . . In this way individual envelopes 20A, 20B, . . . , as shown in FIG. 2d, are produced.

Figure 2E:
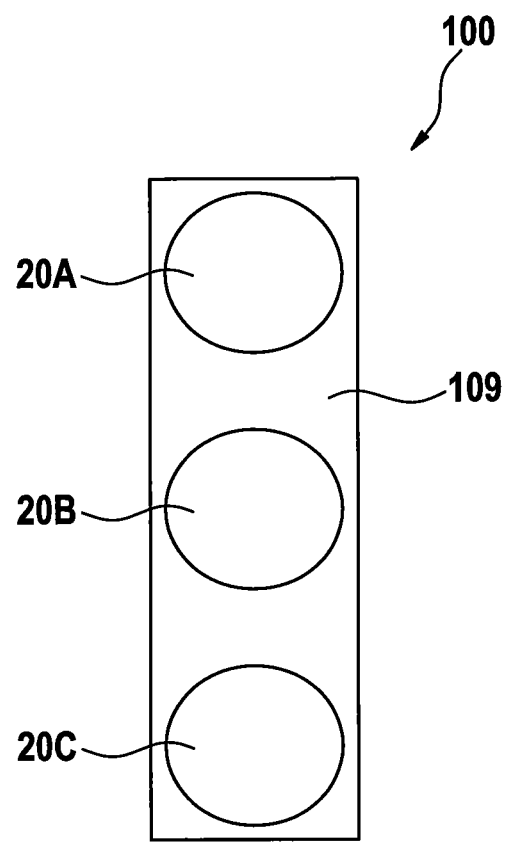
FIGS. 2e-2g show different embodiments of a sheet layer structure including a plurality of interconnected single envelopes.
Figure 2F:
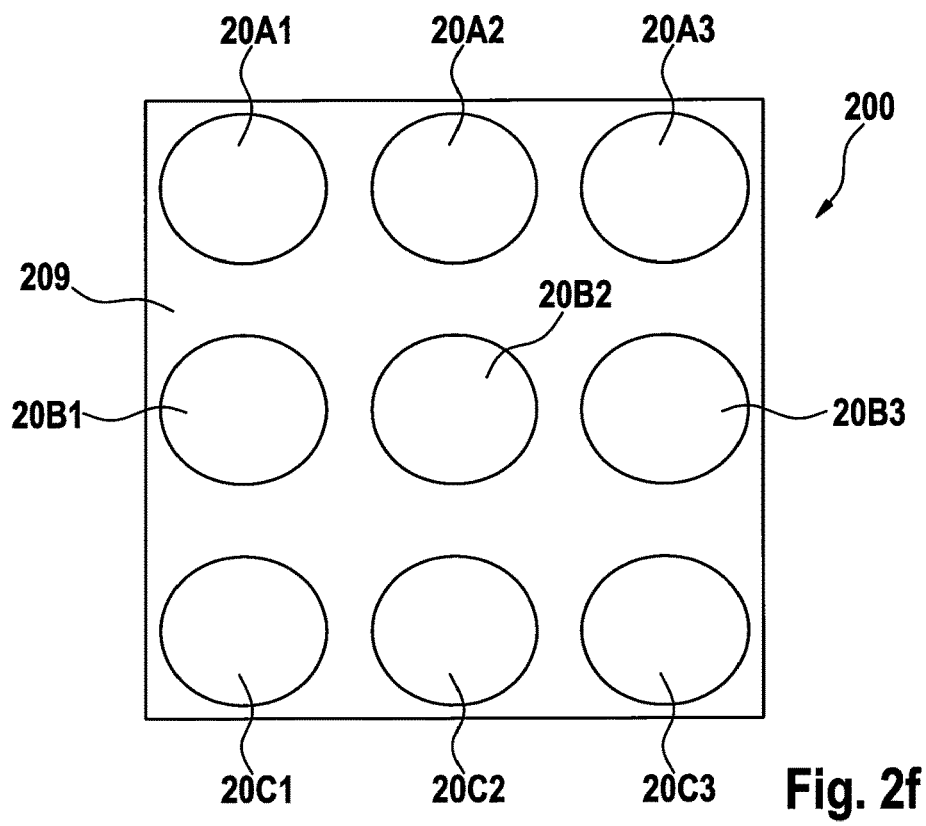

It is even conceivable to omit the fourth step, i.e. the last cutting step. Then instead of a plurality of single envelopes 20, a sandwich type laminate sheet 100 (see FIG. 2e), 200 (see FIG. 2f) including an array of a plurality of envelopes 20A, 20B, 20C, . . . is provided. In such sheet layer structure 100, 200, the envelopes 20A, 20B, 20C, . . . may be aligned along a single line, as indicated for sheet layer structure 100 of FIG. 2e which is produced from a pre-envelope 101 according to FIGS. 2a to 2c. It also possible to use a planar pre-envelope 201 of rectangular or quadrangular shape, and to produce a sheet layer structure 200 including plurality of lines of envelopes 20A1, 20B1, 20C1, . . . , 20A2, 20B2, 20C2, . . . , 20A3, 20B3, 20C3, . . . , such lines of envelopes being arranged next to each other and extending parallel to each other, as shown in FIG. 2f. The material of the sheet layer structure 100 or sheet layer structure 200 outside the envelopes forms a connecting structure 109, 209 for the envelopes 20A1, 20B1, 20C1, . . . , 20A2, 20B2, 20C2, . . . , 20A3, 20B3, 20B3, . . . .

Figure 2G:
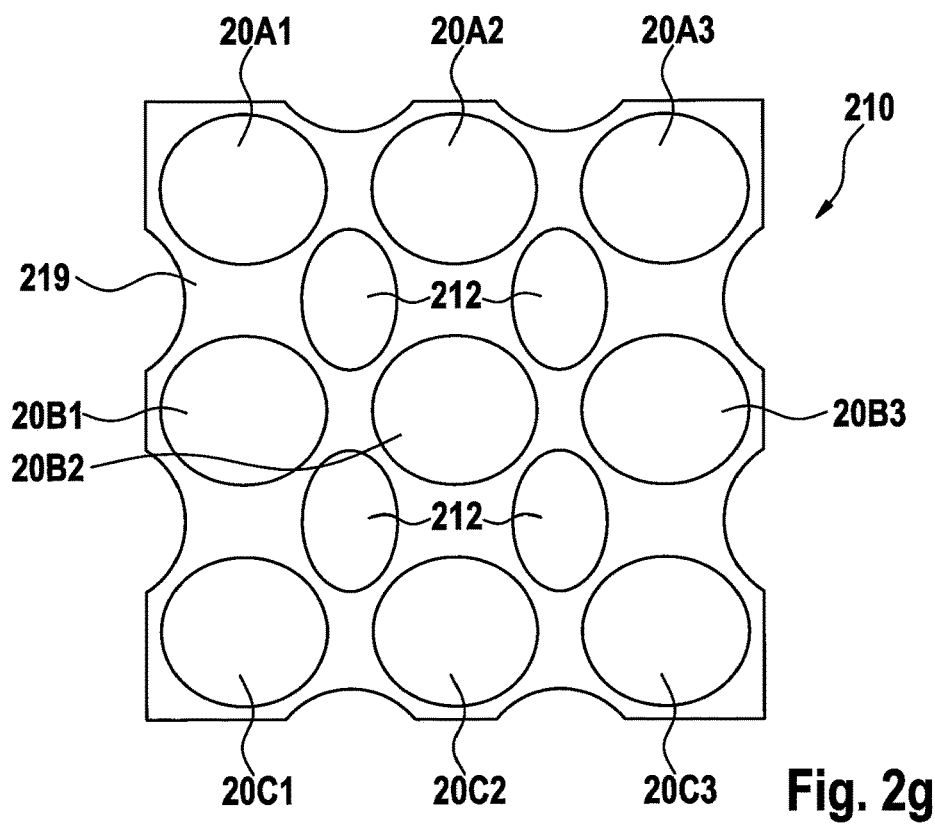

In an further embodiment, shown in FIG. 2g, a mesh 210 of envelopes 20A1, 20B1, 20C1, . . . , 20A2, 20B2, 20C2, . . . , 20A3, 20B3, 20C3, . . . can be produced by cutting non-used portions 212 of the sheet material forming the envelope layers 12, 14 in between adjacent envelopes in such a way that each envelope is still connected to its adjacent envelopes by an interconnecting web 219 formed by the sheet material 12, 14.

Correctness of the filling quantity for envelopes produced according to the second method above can be measured as follows:

A predetermined quantity of envelopes 20 (e.g. 10 envelopes) are produced according to the first to fourth sealing/filling steps above, each of these envelopes 20 is marked and weighed individually on a 4 digit scale (e.g. Satorius BP121S). Each of the envelopes 20 is put on a hot plate with a temperature well above the activation temperate of the gas generating agent 18 to ensure that each of the envelopes 20 will burst and release the gaseous gas generating agent 18 completely. The empty envelopes are weighed individually on a 4 digit scale. The weight loss of each envelope is calculated. In case of humidity pick-up of the envelope material, the envelopes must be conditioned for at least 1 h in the same environment, ideally at 23° C. and 65% relative humidity.

Fluid tightness of the envelope can be measured according to one of the following methods:

Method 1 for Measurement of the Fluid Tightness of the Envelopes:

Each envelope 20 is marked individually. Each envelope 20 is weighed on a 4 digit scale (e.g. Satorius BP121S). The envelopes 20 are stored under predetermined environmental conditions (20° C., 65% relative humidity). The weighing procedure described is repeated after 1 month of storage. This procedure is continued for at least 6 months. The weight loss after 6 months should be less than 20%, better 10%, ideally less than 1% of the filling weight. Additionally, functionality of each envelope 20 is checked after 6 months on a hot plate or in a water bath. The envelope 20 must show thickness increase when subjected to temperature above activation temperature.

Figure 3B:
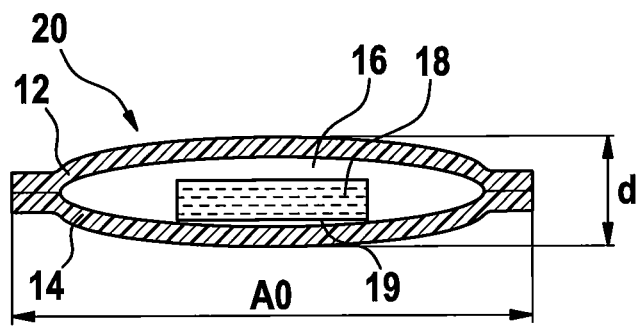
FIG. 3b shows a simplified and schematic cross-sectional view of an envelope enclosing a cavity, according to a further embodiment which includes a gas generating agent applied on a dosing aid.

FIG. 3b shows an envelope 20 enclosing a cavity 16 according to a further embodiment. The envelope 20 shown in FIG. 3b includes a gas generating agent 18 applied on a dosing aid 19. The dosing aid 19 may be made of any material that is able to absorb gas generating agent 18, e.g. an absorbent paper material, a woven or non-woven textile material, or a sponge-like material. In FIG. 3b a blotting paper is used as the dosing aid 19. The dosing aid 19 is soaked with a predefined amount of gas generating agent 18, and then is inserted into the cavity 16. This can be done in a way similar to the first method described above. As an alternative to the procedure described above, the dosing aid 19 may be provided with the gas generating agent 18 in a first step, and then the dosing aid 19 may be arranged in between the first and second envelope layers 12, 14, before the first and second envelope layers are bonded together. Gas generating agent 18, once activated, will be released from dosing aid 19 and inflate cavity 16.

In the embodiment of FIG. 3b the dosing aid 19 has smaller lateral dimension than the cavity 16 has, such that the dosing aid 19 does not interfere with the bonding (e.g. along sealing lines) of the first and second envelope layers 12, 14.

Figure 3C:
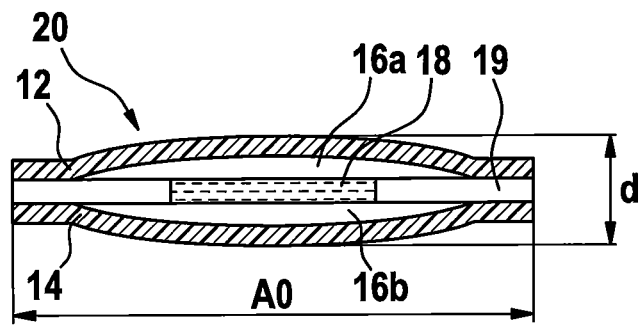
FIG. 3c shows a simplified and schematic cross-sectional view of an envelope enclosing a cavity, according to a further embodiment which includes a gas generating agent applied on a weldable dosing aid layer.

FIG. 3c shows an envelope 20 enclosing a cavity 16 according to a further embodiment. Also in this embodiment, the envelope 20 includes a gas generating agent 18 applied on a dosing aid 19. In this embodiment the dosing aid 19 is made of a material that does not interfere with the bonding process used to bond the envelope layers 12, 14 together, or may even be made of material that does support such bonding process as a sealing layer. This allows the dosing aid 19 to be applied in a sandwich type arrangement between the first and second envelope layers 12, 14 before these are bonded together. The dosing aid 19 may even cover the sealing areas where the first and second envelope layers 12, 14 are to be bonded together. Hence the dosing aid 19 may have a sheet like configuration and be used in the form of a dosing aid layer 19 interposed in between the first and second envelope layers 12, 14 and covering the whole sealing area of the first and second envelope layers 12, 14. The first and second envelope layers 12, 14 are bonded together along the sealing areas, e.g. by welding, with the dosing aid 19 interposed.

Given the gas generating agent 18 does not interfere with the bonding of the first and second envelope layers 12, 14, gas generating agent 18 may be applied to the dosing aid 19 as a whole. To restrict areas where gas generating agent is applied to the dosing aid in a sealing portion, the gas generating agent 18 may be applied in the form of discrete stripes onto the dosing aid 19. Distance between the stripes can then be selected such that each envelope is crossed by one stripe of gas generating agent. It will generally be more advantageous to apply the gas generating agent 18 only at those portions of the dosing aid 19 which will be inside the cavity 16, i.e. which will be fully enclosed by sealing areas where the first and second envelope layers 12, 14 are bonded together. In this way, the desired predetermined amount of gas generating agent 18 for proper activation and inflating of the envelope 20 can be adjusted more precisely. E.g. the gas generating agent 18 may be applied to the dosing aid 19 in an array of a plurality of discrete spots or areas, all of which are fully enclosed in a respective cavity 16.

In an embodiment where the first and second envelope layers 12, 14 are bonded together by welding having the dosing aid in between, the dosing aid 19 may be made of a textile structure like polypropylene non-woven; or may be made of a porous material like expanded polyethylene (ePE) or expanded polypropylene (ePP). Each of these materials allows welding of the first envelope layer 12 to the second envelope layer 14 with a layer of that material interposed in between.

In a further embodiment, the first envelope layer 12 and/or the second envelope layer 14 may provide the function of the dosing aid 19. This can be achieved by forming the innermost layers of the first envelope layer 12 and/or the second envelope layer 14, which come into contact when welding the first envelope layer 12 to the second envelope layer 14, from a suitable material, e.g. the materials mentioned before.

In the embodiment shown in FIG. 3c the dosing aid 19 is interposed in the form of a further layer in between the first and second envelope layers 12, 14 in such a way that two sub-cavities 16a and 16b are formed. Subcavity 16a is enclosed by upper envelope layer 12 and dosing aid layer 19, subcavity 16b is enclosed by lower envelope layer 14 and dosing aid layer 19. Gas generating agent 18, once activated, will be released from dosing aid 19 and inflate subcavities 16a and 16b. As dosing aid 19 is not fluid tight with respect to gas generating agent 18, at least not while the gas generating agent 18 is in the activated configuration (gaseous configuration), some exchange of gas generating agent 18 between subcavities 16a and 16b remains possible. This embodiment has the advantage that the convection of the gas generating 18 agent within the envelope 20 is limited.

Figure 3D:
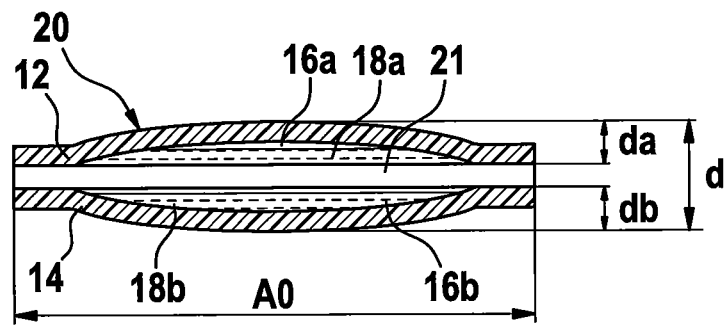
FIG. 3d shows a simplified and schematic cross-sectional view of an envelope, according to a further embodiment, the envelope enclosing two cavities each including a gas generating agent.

FIG. 3d shows another envelope 20 according to a further embodiment. The envelope 20 of FIG. 3d has first and second envelope layers 12, 14 and an intermediate layer 21. In the embodiment shown, the intermediate layer 21 has a configuration according to the layer 8 in FIG. 1b, but may have other configuration in other embodiments. The intermediate layer 21 is interposed between layer 12 and layer 14 in a sandwich type arrangement. Similar to the embodiment of FIG. 3c, this arrangement provides for two subcavities 16a and 16b being formed. However, different from the embodiment of FIG. 3c, the gas generating agent 18 is provided separately as first gas generating agent 18a for subcavity 16a and as a second gas generating agent 18b for second subcavity 16b. In a further embodiment (not shown in the figures) the first gas generating agent 18a may be provided by a first dosing aid 19a, similar to the embodiment of FIG. 3b. The second gas generating agent 18b may be provided by second dosing aid 19b, also similar to the embodiment of FIG. 3b.

Further, the intermediate layer 21 is made of essentially fluid tight material with respect to gas generating agent 18a, 18b in the unactivated configuration as well as with respect to gas generating agent 18a, 18b in the activated configuration. Intermediate layer 21 is also made of material that provides a fluid tight bonding between first and second envelope layers 12, 14, as described above. A suitable combination of materials in the embodiment of FIG. 3d is: First envelope layer 12: PET/Al/PE (see FIG. 1a); intermediate layer 21: PE/Al/PE (see FIG. 1b); second envelope layer 14: PET/Al/PE (see FIG. 1a).

It is also possible to use an intermediate layer 21 being coated with a dosing aid layer 19a and a dosing aid layer 19b on both of its sides, such coating layers 19a, 19b acting as a dosing aid for the first and second subcavities 16a, 16b, respectively.

In the embodiment of FIG. 3d, the size/volume of subcavities 16a and 16b, and correspondingly the amount of gas generating agent 18a, 18b to be filled in the subcavities 16a, 16b can be adjusted as desired. It is also possible to use different gas generating agents 18a and 18b in subcavities 16a and 16b, respectively. This can be important, as regularly one of the subcavities 16a, 16b will be arranged closer to a source of heat than the other subcavity. Thus, the envelope 20 of FIG. 3d can be designed in such a way that the gas generating agent 18a or 18b in the subcavity 16a or 16b which is arranged closer to the source of heat has a higher activation temperature than the other subcavity. Further, provision of two "independent" subcavities provides for redundance in the sense that the adaptive insulation system still works in case one of the subcavities is broken.

FIG. 3d further indicates that the thickness d of envelope 20 will be determined by the sum of two distances da (thickness of first subcavity 16a), and db (thickness of second subcavity 16b). Both da and db will increase in case gas generating agents 18a, 18b will change from the unactivated configuration to the activated configuration, respectively. Increase in distance between the first layer and the second layer of the laminar structure according to the invention after activation of the gas generating agents 18a and 18b from D0 to D1 (see FIGS. 6a and 6b) will be substantially identical to the increase in thickness d of the envelope 20, and hence given by increase in thickness da of the first subcavity 16a plus the increase in thickness db of second subcavity 16b.

Besides facilitating the accurate dosing of gas generating agent 18, dosing aid 19, as shown in FIG. 3c, provides the advantage that it can be applied in a sandwich type configuration as an intermediate sheet in between the first and second envelope layers 12 and 14. This allows for simplified manufacture of the envelopes 20. It is possible to manufacture a plurality of envelopes 20 using only one sheet of envelope layer 12, one sheet of dosing aid layer 19 and one sheet of envelope layer 14. Using a dosing aid layer 19 as described is particularly helpful for the manufacture of a planar sheet of envelopes 200, as shown in FIG. 2f, or of a mesh of envelopes 210, as shown in FIG. 2g.

Figure 4A:
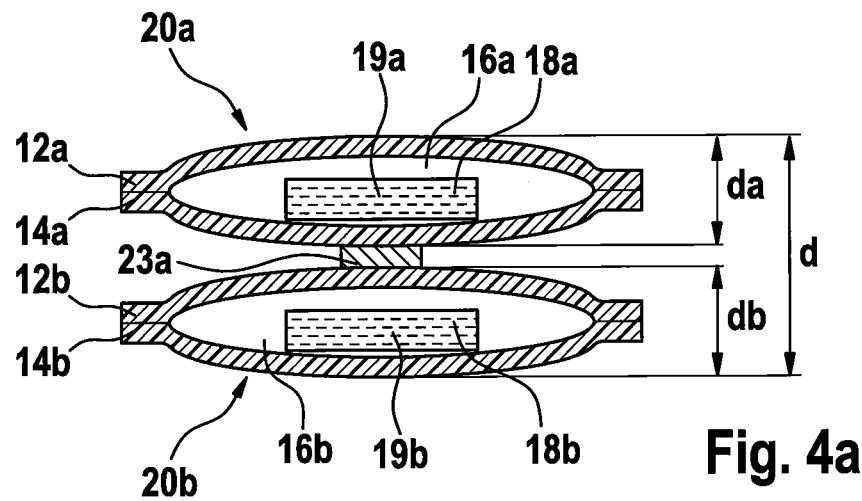
FIG. 4a shows a schematic arrangement of two identical envelopes, according to a further embodiment, bonded together one on top of the other.
Figure 4B:
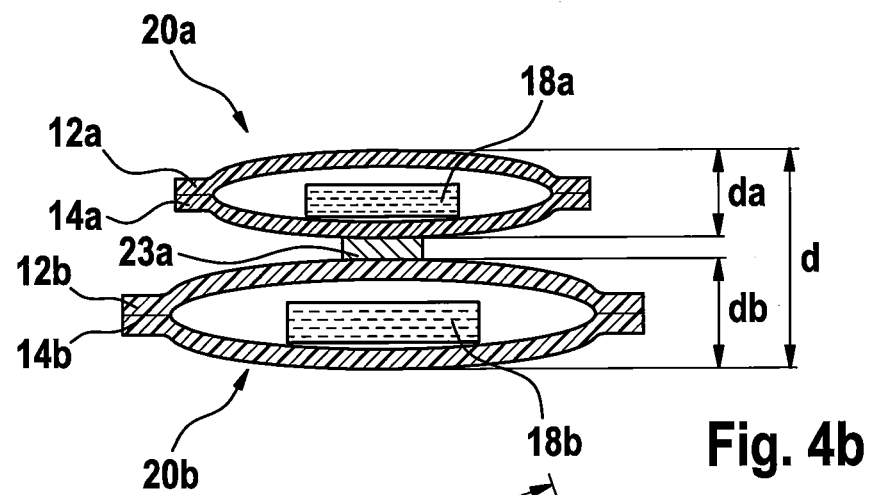
FIG. 4b shows a further schematic arrangement of two envelopes of different shape, according to a further embodiment, bonded together one on top of the other.
Figure 4C:
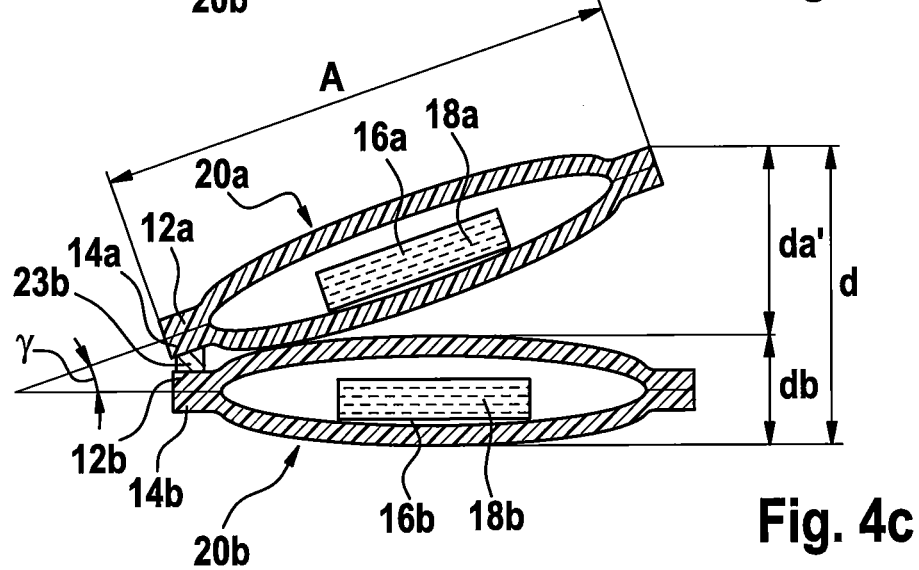
FIG. 4c shows a further schematic arrangement of two envelopes, according to a further embodiment, bonded together at one of their lateral ends.

FIGS. 4a, 4b and 4c show arrangements of two envelopes 20a and 20b which are bonded together via a bond 23a to form an envelope structure. Such arrangement has in use very similar properties to the embodiment shown in FIG. 3d. Each of the envelopes 20a, 20b encloses a respective cavity 16a, 16b. First cavity 16a includes a first dosing aid 19a provided with first gas generating agent 18a in a manner similar to the embodiment of FIG. 3b. Second cavity 16b includes a second dosing aid 19b provided with second gas generating agent 18b in a manner similar to the embodiment of FIG. 3b. Alternatively to the use of a dosing aid 19a, 19b according to the embodiment of FIG. 3b, gas generating agents 18a and 18b may be provided without using a dosing aid, similar to the embodiment of FIG. 3a, or using a dosing aid layer 19a, 19b, similar to the embodiment of FIG. 3c. Each envelope 20a, 20b is essentially fluid tight. As to the options for activation of first and second gas generating agents 18a, 18b, the same applies as outlined above with respect to the embodiment of FIG. 3d.

In the embodiment of FIG. 4a both envelopes 20a, 20b have an essentially identical size. FIG. 4b shows a further embodiment which is identical to the embodiment of FIG. 4a except that the envelope 20a is smaller than the envelope 20b.

In the embodiments of FIGS. 4a and 4b the envelopes 20a, 20b are bonded together by a bond located in a central portion of the envelopes 20a, 20b. Hence, similar to the embodiment of FIG. 3d thickness d of the envelope structure is determined by the sum of two distances da (thickness of first cavity 16a) and db (thickness of second cavity 16b). Increase in distance D between the first layer and the second layer after activation of the gas generating agents 18a and 18b will be substantially identical to the increase in thickness d of the envelope structure, and hence given by increase in thickness da of the first cavity 16a plus the increase in thickness db of second cavity 16b.

Bonding of the envelopes 20a and 20b can be effected by suitable adhesives, by welding or by stitching (in the case of stitching proper measures should be taken to maintain fluid tightness).

FIG. 4c shows a further schematic arrangement of two envelopes 20a, 20b bonded together to form an envelope structure. In this embodiment, envelopes 20a, 20b are bonded together by a bond 23b located at one of the lateral ends of envelopes 20a, 20b. As can be seen in FIG. 4c, by such lateral arrangement of bond 23b an angle $\gamma$ larger than zero is formed in between the lateral plane of the first envelope 20a and the lateral plane of second envelope 20b. The lateral plane of an envelope 20a, 20b is defined as a plane orthogonal to the thickness direction of the envelope, respectively.

With a lateral bond 23b as shown in FIG. 4c, thickness d of the envelope structure is not determined by the sum of the thickness da of first cavity 16a plus the thickness db of second cavity 16b, wherein da and db are measured orthogonal to the planar planes of cavities 16a, 16b, respectively (as indicated for the embodiments of FIGS. 4a and 4b). Rather, as shown in FIG. 4c, the thickness d of the envelope structure is determined by the thickness db of second cavity 16b plus an "effective thickness" da' of first cavity 16a.

"Effective thickness" da' of first cavity is given approximately by da'≈A sin γ, where A is the lateral dimension of first envelope 20a.

The angle γ will increase when, after activation of the gas generating agents 18a, 18b, the first and second envelopes 20a, 20b change their condition from the unactivated condition (both envelopes 20a, 20b being essentially flat) to the activated condition (both envelopes 20a, 20b being inflated and thus convex shaped). Thereby the increase in effective thickness da' of the first cavity 16a in the activated configuration of gas generating agents 18a, 18b becomes larger than the increase in thickness da of the first cavity 16a measured orthogonal to planar plane of cavity 16a (see FIGS. 4a and 4b). Increase in distance D between the first layer and the second layer of the inventive laminar structure after activation of the gas generating agents 18a and 18b will be substantially identical to the increase in thickness d of the envelope structure, and hence given by increase in effective thickness da of the first cavity 16a plus the increase in thickness db of second cavity 16b.

By increasing the angle γ when changing from the unactivated condition to the activated condition, the envelope structure of FIG. 4c provides a function similar to a hinge. This is a very efficient way of increasing such distance, in particular in case the envelopes have an essentially flat configuration in the unactivated condition, since in such configuration the lateral dimension A of the envelopes is large, and the angle γ will increase significantly upon activation. Even more than two envelopes 20a, 20b can be bonded together in this way to provide pronounced hinge-type behaviour in the way of unfolding an accordion, when changing from the unactivated condition to the activated condition.

A consequence of this hinge-type behaviour is that the envelope structure allows for a large increase in distance between a first layer and the second layer in a fabric structure having the envelope structure of FIG. 4c sandwiched in between. Alternatively, to achieve a desired increase in distance between the first layer and the second layer, an envelope structure can be used covering much less area of the fabric than it would be necessary if single envelopes were used, or even if envelope structures as show in FIGS. 4a and 4b were used.

By arranging a plurality of two or even more envelopes 20a, 20b, . . . on top of each other, as just described, very large increase in thickness of the envelope structure as a whole can be achieved, thereby enabling a very pronounced increase in distance between first layer and second layers. The result is a very effective increase in thermal insulating capability as a result of a temperature change. This particularly holds for the embodiment of FIG. 4c providing for a hinge-type effect when changing from the unactivated condition to the activated condition.

Also in the embodiment of FIG. 4c, bonding of the envelopes 20a and 20b can be effected by suitable adhesives, by welding or by stitching (in the case of stitching proper measures should be taken to maintain fluid tightness). A further possibility is to provide the envelopes 20a, 20b in the form of a sheet layer structure 100, 200, 210 of a type as shown in FIGS. 2c, 2d, 2e. Such sheet layer structure may easily be folded to provide an envelope structure of the type shown in FIG. 4c.

Figure 5A:
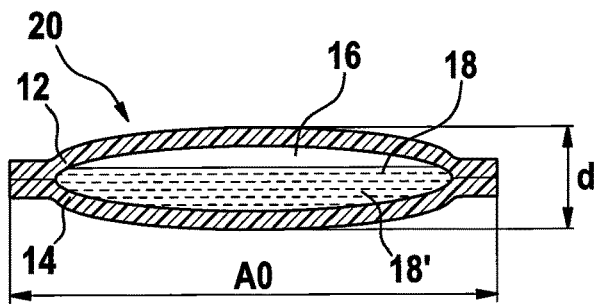
FIG. 5a shows a simplified and schematic cross-sectional view of an envelope, according to a further embodiment, in an unactivated condition.
Figure 5B:
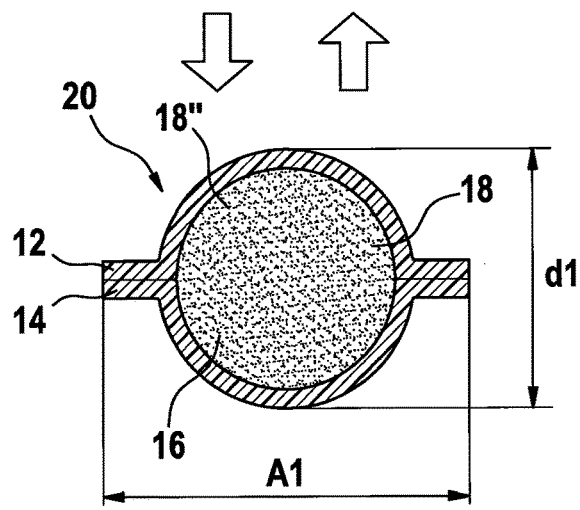
FIG. 5b shows a simplified and schematic cross-sectional view of an envelope, according to a further embodiment, in an activated condition.

The functionality of a laminar structure providing adaptive thermal insulation according to the invention in an activation cycle is demonstrated in FIGS. 5a and 5b. Only a single envelope 20 is used in FIGS. 5a and 5b for demonstration purposes, it be understood that a laminar structure according to the invention may include any number of envelopes 20 or envelope structures, as desired. FIG. 5a shows the envelope 20 in an unactivated condition, as shown in FIG. 3a, with the gas generating agent 18 in the liquid phase (indicated as 18'). FIG. 5b shows the envelope 20 in an activated condition, i.e. after the gas generating agent 18 has been evaporated into its gaseous phase (indicated as 18"). It can be seen by comparing FIGS. 5a and 5b that the shape of the envelope 20 has changed from a flat shape with only small thickness d0 (corresponding to the distance d0 between the outer surfaces of first laminated layer 12 and second laminated layer 14 in thickness direction of the envelope 20) in the unactivated condition to a concave shape with much larger thickness d1 (corresponding to distance d1 in FIG. 5b). Correspondingly the dimension of the envelope 20 in directions orthogonal to the thickness direction reduces slightly from a dimension A0 in the unactivated condition to a dimension A1 in the activated condition. The first and second laminate layers 12, 14 are made of essentially non-stretchable material which does not significantly elongate in any direction after response to activation of the gas generating agent 18. However, in response to increasing pressure in the cavity 16 upon activation of the gas generating agent 18, the shape of the envelopes 20 changes in such a way that a maximum volume of the cavity 16 has been built.

Figure 6A:
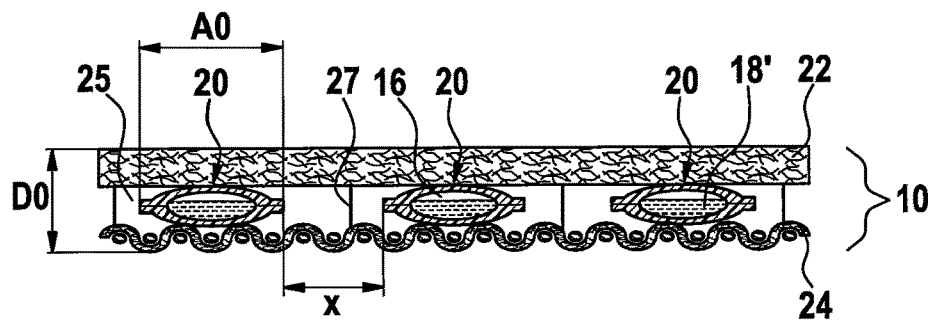
FIG. 6a shows a simplified and schematic cross-sectional view of a laminar structure, according to an embodiment, formed with a plurality of envelopes positioned in between a first layer and a second layer in an unactivated condition.
Figure 6B:
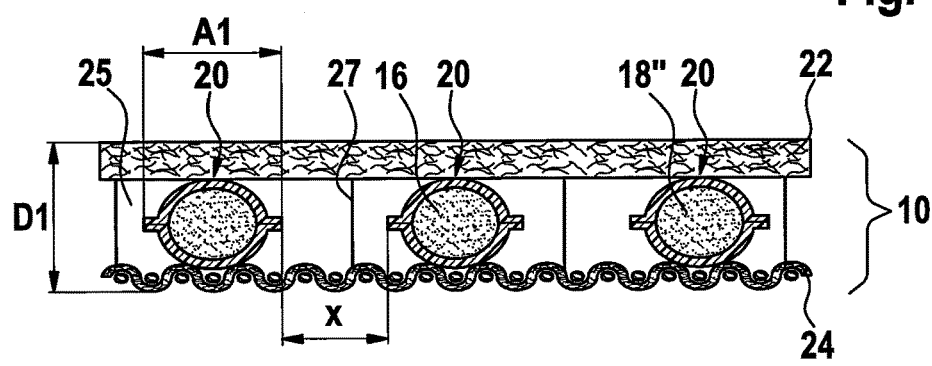
FIG. 6b shows a simplified and schematic cross-sectional view of the laminar structure of the embodiment shown in FIG. 5a, in an activated condition.

FIGS. 6a and 6b show an exemplary embodiment of a laminar structure 10 according to the invention.

The embodiment of FIGS. 6a and 6b comprises a plurality of envelopes 20 (as described in detail with respect to FIGS. 3a to 5b above) positioned in between a first layer 22 and a second layer 24. Both the first and second layer 22, 24 may be textile layers. In a possible configuration the textile layers 22, 24 may be connected via stitches 27 in the form of a quilted composite. In this way, pockets 25 are formed by the first and second layers 22, 24. In this embodiment, each of these pockets 25 receives a respective one of the envelopes 20. Other embodiments are conceivable in which each pocket 25 receives more than one envelope 20, or where part of the pockets 25 do not receive any envelope 20. Of course, instead of single envelopes, the pockets 25 may receive an envelope structure. The envelopes 20 are thus fixed by their respective pocket 25 with respect to movement in the length/width plane defined by the layers 22, 24.

In a possible configuration, the first layer 22 may be a textile having flame resistant properties. In one example the first layer 22 is made of 55 g/m² spun-laced non-woven of aramid fiber (available as Vilene Fireblocker from the company Freudenberg). The second layer 24 may be a fire resistant textile liner made of 125 g/m² aramid viscose FR blend 50/50 woven (available from the company Schueler). Both, the first layer 22 and the second layer 24 may be either a non woven or a woven, depending on the application.

Comparing FIGS. 6a and 6b it is evident that activation of the gas generating agent 18 provides for a volumetric increase ("inflation") of the envelopes 20 in the pockets 25. Such inflation of the envelopes 20 induces movement of the first layer 22 and second layer 24 away from each other and increases the distance D between the first layer 22 and the second layer 24 from a first distance D0 to a second distance D1. FIGS. 6a and 6b further show that in case the first layer 22 and/or the second layer 24 have a structure with embossments and depressions, it may be convenient to measure the distances D0, D1 with respect to reference planes of the first and second layers 22, 24 respectively. In the example shown the distances D0, D1 are measured using reference planes touching the most distant points of the first and second layers 22, 24 respectively.

FIGS. 6*a* and 6*b* further show that the envelopes 20 are received in the pockets 25 in such a way that gaps remain free in between each two neighbouring envelopes 20. The distance of these gaps is indicated by X. It can be seen that this distance X remains nearly constant or even increases slightly, when the gas generating agent 18 in the envelopes 20 changes from the unactivated configuration to the activated configuration. Further, thermally triggered shrinkage of the laminate structure 10 is advantageously reduced.

Figure 7A:
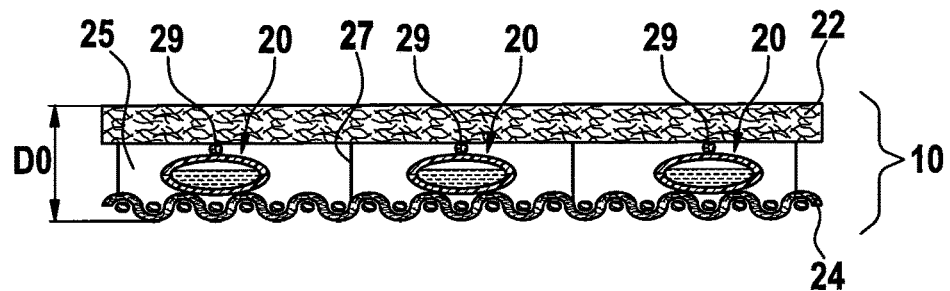
FIG. 7a shows a simplified and schematic cross-sectional view of a laminar structure, according to a further embodiment, with a plurality of envelopes positioned in between a first layer and a second layer, in an unactivated condition.

FIG. 7*a* shows a simplified and schematic cross-sectional view of a laminar structure 10 according to a further embodiment. The laminar structure 10 is similar to FIG. 6*a* with a plurality of envelopes 20 positioned in between a first layer 22 and a second layer 24 in an unactivated condition. In the embodiment of FIG. 7*a* the envelopes 20 are fixed to layer 22 by means of adhesive spots 29. Such adhesive spots 29 may provide fixation of the envelopes 20 only temporarily for mounting purposes. In such case, typically additional measures for fixing the envelopes 20 in position will be provided, e.g. stitches 27 to form pockets in the type of a quilted composite structure as shown in FIG. 6*a*.

Figure 7B:
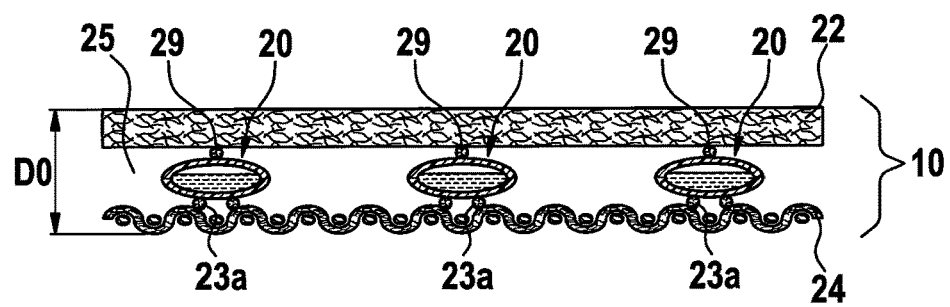
FIG. 7b shows a simplified and schematic cross-sectional view of a laminar structure, according to a further embodiment, with a plurality of envelopes positioned in between a first layer and a second layer, in an unactivated condition.

Alternatively, the adhesive spots 29 may be formed of an adhesive providing durable fixation of the envelopes with respect to either first layer 22 (see FIG. 7*a*) or second layer 24, or to both of them (see FIG. 7*b*). In such case, additional stitches 27 are not absolutely necessary.

Figure 7C:
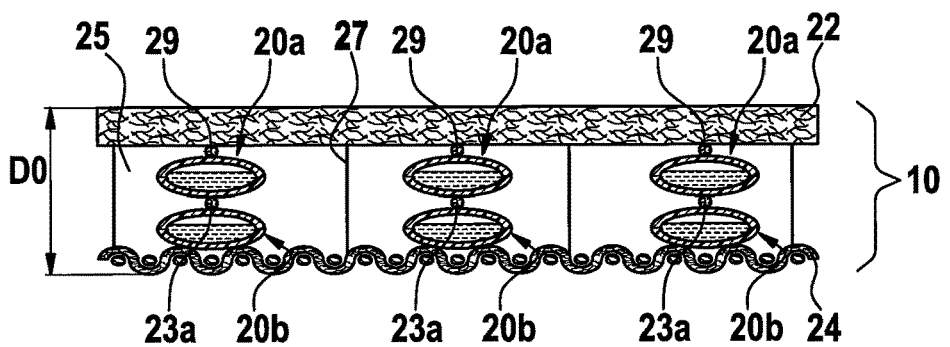
FIG. 7c shows a simplified and schematic cross-sectional view a of laminar structure, according to a further embodiment, with a plurality of envelopes positioned in between a first layer and a second layer, in an unactivated condition.
Figure 7D:
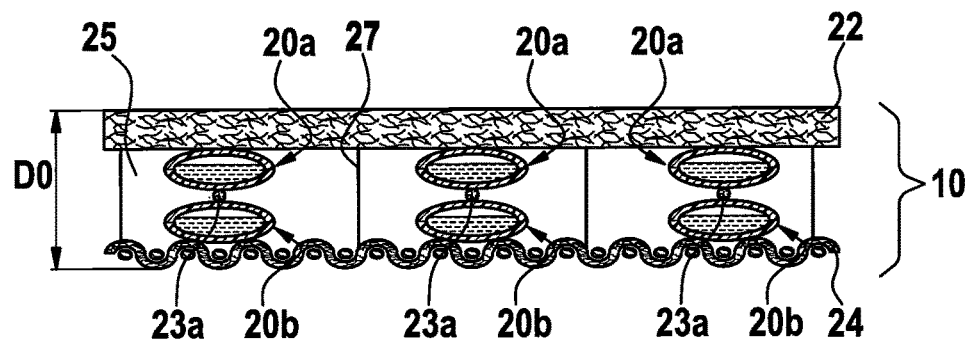
FIG. 7d shows a simplified and schematic cross-sectional view of a laminar structure, according to a further embodiment, with a plurality of envelopes positioned in between a first layer and a second layer, in an unactivated condition.

It is also possible to fix envelope structures of a type as described above at a respective position using suitable adhesive spots 29. As an example, FIG. 7*c* shows an embodiment with double envelope structures fixed to each other via an adhesive spot 23*a*, wherein each envelope structure is fixed to the first layer 22 by respective further adhesive spots 29. Alternatively, envelope structures of two or more envelopes 20, respectively, may be formed by connecting the envelopes 20 with each other via adhesive spots 23*a* and inserting the composite structures into respective pockets 25 without connecting the composite envelope structures with any of the first layer 22 and second layer 24, see FIG. 7*d* (double envelope structures fixed to each other via adhesive spots 23*a*, but unfixed with respect to first layer 22 and second layer 24).

In all embodiments shown, the envelopes 20 may be connected with the first layer 22 and/or the second layer 24 via stitches, instead of adhesive spots 29 (not shown in the figures).

Figure 7E:
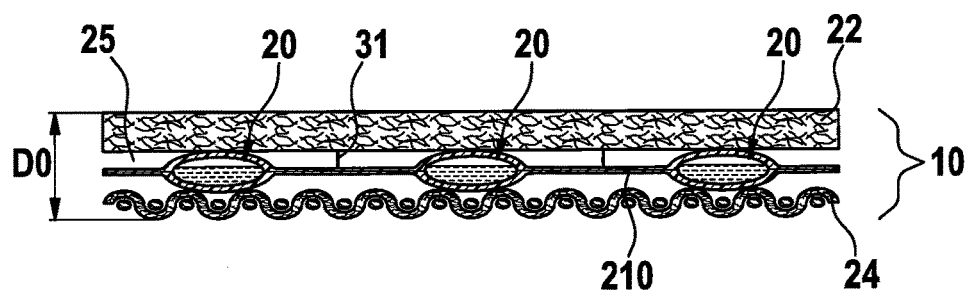
FIG. 7e shows a simplified and schematic cross-sectional view of a laminar structure, according to a further embodiment, with a plurality of envelopes in the form of a "mesh of envelopes" positioned in between a first layer and a second layer, in an unactivated condition.

FIG. 7*e* shows a laminar structure 10, according to a further embodiment, with a plurality of envelopes 20 forming a sheet layer structure 210 of envelopes in an unactivated condition. The sheet layer structure 210 is of a mesh type as shown in FIG. 2*g* and is positioned in between a first layer 22 and a second layer 24. The envelopes 20 are formed as an array of envelopes 20. Stitches 31 can be used to fix the sheet layer 210 of envelopes at the first layer 22 and/or second layer 24. Connection of a plurality of envelopes may be provided by producing an array of envelopes 20 from sheet like laminate layers 12, 14 (and intermediate layer 18, dosing aid 19, if desired), see FIG. 2*g*, and optionally cutting only unused spaces in between individual envelopes 20 in such a way that the envelopes 20 are connected with each other via remaining webs of material formed by first and second laminate layers 12, 14, see FIG. 2*g*. Such a mesh 210 of envelopes is breathable.

In FIG. 7*e* first layer 22 and the second layer 24 are not fixed to each other. Only the sheet layer 210 of envelopes is fixed to the first layer 22, and may optionally be fixed to the second layer 24. The laminar structure 10 in such embodiment provides a relatively loosely coupled structure. Such arrangement facilitates assembly of the laminar structure 10 and provides for flexibility. In case a tighter connection between the first and the second layer 22, 24 is desired it is possible to additionally provide stitches joining the first and second layers 22, 24 with each other. Generally such additional stitches will be provided with larger distances to each such as to form rather large pockets. In a further embodiment it is possible to connect a plurality of envelopes 20 such as to form a chain of envelopes 20 (see e.g. FIG. 2*e*), and to connect the first layer 22 and the second layer 24 via a plurality of parallel stitches 31 running parallel to each other. The first and second layers 22, 24 thus will form a plurality of channels in between each two adjacent stitches 31. Into such channels a respective chain of envelopes 20 may be introduced.

Figure 7F:
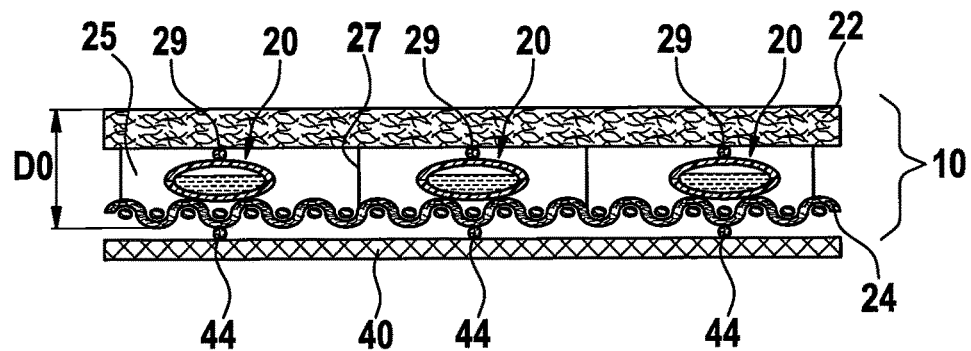
FIG. 7f shows a simplified and schematic cross-sectional view of a laminar structure, according to a further embodiment, with a plurality of envelopes positioned in between a first layer and a second layer and an additional functional membrane laminated onto one of the first and second layers, in an unactivated condition.

FIG. 7*f* shows a laminar structure 10, according to a further embodiment in an unactivated condition. The laminar structure 10 of FIG. 7*f* is similar to the embodiment shown in FIG. 7*a* and has an additional functional layer 40 attached to at least the first layer 22 or the second layer 24. In the embodiment of FIG. 7*f* the functional layer 40 is attached to the second layer 24. The additional functional layer 40 may include a water vapour permeable and waterproof membrane, as described above, and thus provide for water proofness of the laminar structure 10, and also for a barrier against other liquids and gases, while still maintaining the laminar structure 10 water vapor permeable. For a more detailed description of the functional layer, see the description above.

The additional functional layer 40 is applied to the second layer 24 in a low temperature bonding process by using adhesive spots 44, in order to avoid activation of the laminar structure 10 when the functional layer 40 is applied. A functional layer 40 may be attached to the first layer 22 and/or to the second layer 24.

Figure 8A:
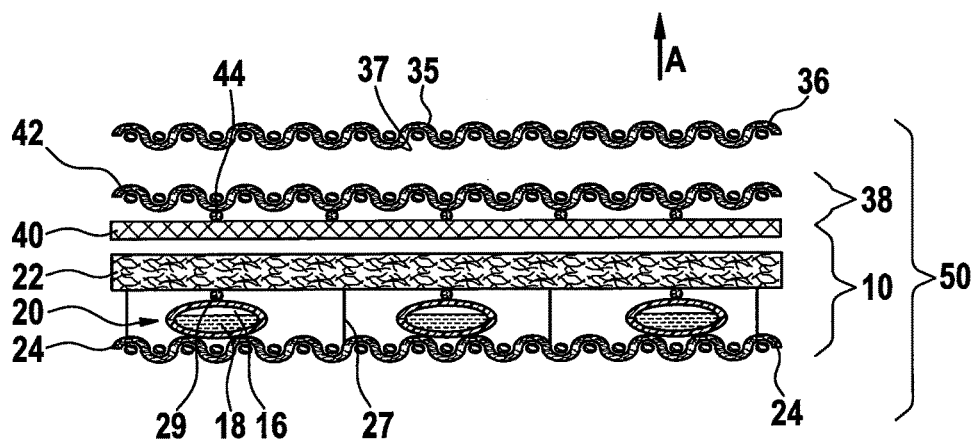

FIG. 8*a* shows a simplified and schematic cross-sectional view of a fabric composite 50 including a laminar structure 10 as shown in FIG. 7*a*. The fabric composite 50 comprises a plurality of layers arranged to each other, seen from an outer side A of a garment made with such fabric composite 50:

(1) an outer heat protective shell layer 36 having an outer side 35 and an inner side 37;
(2) a barrier laminate 38 comprising a functional layer 40, the barrier laminate 38 is arranged on the inner side 37 of the outer heat protective shell layer 36; and
(3) a laminar structure 10 providing adaptive thermal insulation as shown in FIG. 7*a*, the laminar structure 10 is arranged on the inner side of the barrier laminate 38.

The outer side A means for all the embodiments in the FIGS. 8*a* to 8*g* said side which is directed to the environment.

The barrier laminate 38 includes a functional layer 40 which typically comprises a waterproof and water vapor permeable membrane for example as described above. The functional layer 40 is attached to at least one layer 42 via an adhesive layer 44 (two layer laminate). Layer 42 may be a woven or non-woven textile layer. Adhesive layer 44 is configured such as not to significantly impair breathability of the barrier laminate 38. In further embodiments barrier laminate 38 comprises two or more textile layers wherein the functional layer is arranged between at least two textile layers (three layer laminate).

FIG. 8a shows that the laminar structure 10 providing adaptive thermal insulation is positioned as the innermost layer of the fabric composite 50. Such innermost liner will be facing the wearer's skin in case the fabric composite 50 is used to manufacture garment. Because of being positioned on the far side with respect to the source of heat, the laminar structure 10 is expected to experience much lower temperatures than existing at the outer shell 36 of the garment. This has a benefit in that the temperature resistance of the materials used for the laminar structure 10 need not be as high as it would be required for material positioned close to the outer shell 36. It has been shown that in such arrangement a relatively precisely controllable adaptive thermal insulation mechanism can be implemented using the laminar structure 10 with first layer 22, second layer 24 and cavity 16 filled with a gas generating agent 18 according to the invention, avoiding unnecessary activation at only moderately increased temperatures, on the one hand, and avoiding a catastrophic failure to activation in cases of only slightly stronger increase in temperature than anticipated for an activating event, on the other hand.

Figure 8B:
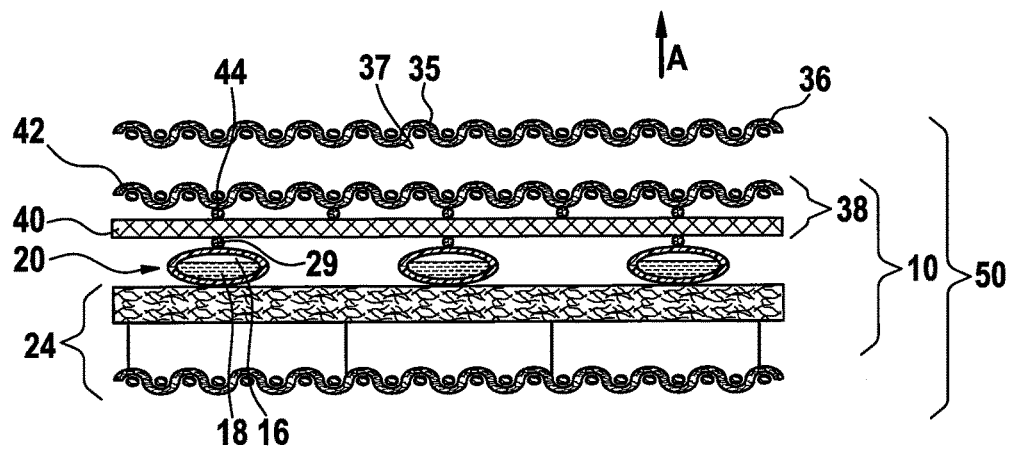

Other configurations of fabrics 50 to which the laminar structure 10 can be applied are shown in FIGS. 8b to 8f:

In FIG. 8b the fabric composite 50 includes an outer layer 36 with an outer side 35 and an inner side 37. A laminar structure 10 providing adaptive thermal insulation is positioned on the inner side 37 of the outer layer 36. The laminar structure 10 comprises a barrier laminate 38 having a functional layer 40 adhesively attached to a textile layer 42 for example by adhesive dots 44, an inner layer 24 forming an innermost liner and envelopes 20 arranged between the barrier laminate 38 and the inner layer 24. The envelopes 20 of the laminar structure 10 are bonded to the inner side of functional layer 40 via a suitable discontinuous adhesive 29, e.g. silicone, polyurethane. The inner layer 24 may comprises one or more textile layers. In this embodiment barrier laminate 38 has the function of the first layer of the laminar structure providing adaptive thermal insulation.

Figure 8C:
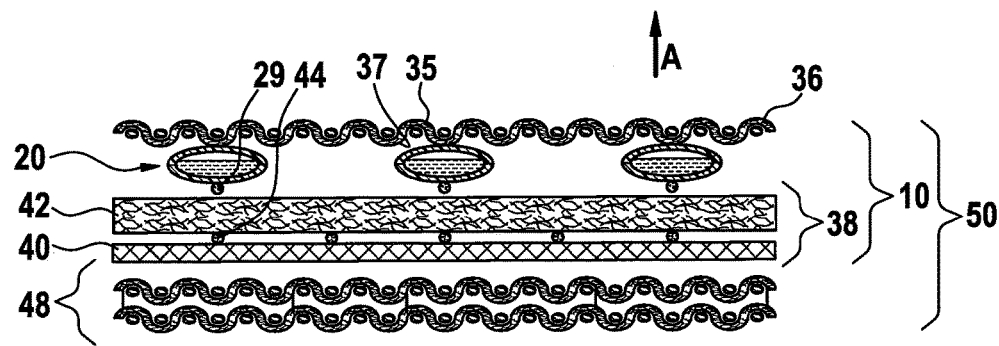

In FIG. 8c the fabric composite 50 includes a laminar structure 10 providing adaptive thermal insulation. The laminar structure 10 comprises an outer layer 36 with an outer side 35 and an inner side 37 and a barrier laminate 38 having a functional layer 40 adhesively attached to a textile layer 42 for example by adhesive dots 44. The laminar structure 10 further comprises envelopes 20 which are arranged between the inner side 37 of the outer layer 36 and the barrier laminate 38. In particular the envelopes 20 are adhesively bonded to the outer side of the textile layer 42 by adhesive dots 29. In this embodiment barrier laminate 38 has the function of the second layer of the laminar structure 10 providing adaptive thermal insulation and outer layer 36 has the function of the first layer of the laminar structure 10 providing adaptive thermal insulation. The composite 50 further comprises an inner layer 48 which may comprise one or more textile layers.

Figure 8D:
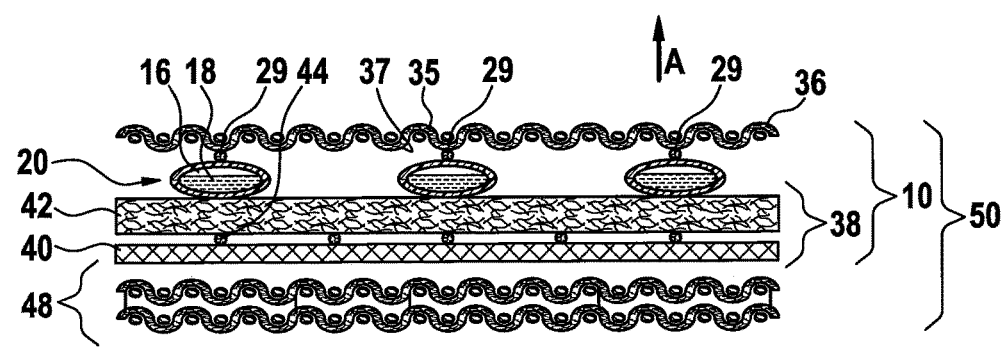

In FIG. 8d the fabric composite 50 includes a laminar structure 10 providing adaptable thermal insulation. The laminar structure 10 comprises an outer layer 36 with an outer side 35 and an inner side 37 and a barrier laminate 38 having a functional layer 40 adhesively attached to a textile layer 42 for example by adhesive dots 44. The laminar structure further comprises envelopes 20 which are bonded to the inner side 37 of the outer layer 36 for example by a discontinuous adhesive in the form of adhesive dots 29. In this embodiment barrier laminate 38 has the function of the second layer of the laminar structure 10 providing adaptive thermal insulation and outer layer 36 has the function of the first layer of the laminar structure 10 providing adaptive thermal insulation. The composite 50 further comprises an inner layer 48 which may comprise one or more textile layers.

The insulation capability of the individual layers can be adjusted as required for a particular application, e.g. by area weight, thickness, number of layers.

Figure 8E:
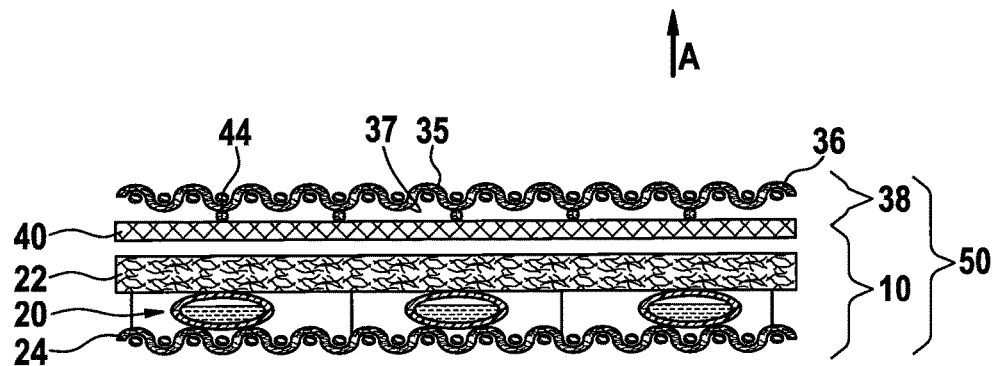

In FIG. 8e the fabrics composite 50 comprises a laminar structure 10 including a first layer 22 and a second layer 24 with a plurality of envelopes 20 in between as shown in FIG. 6a. Further the fabric composite 50 includes a barrier laminate 38 forming the outer shell of the composite 50 and being positioned on the outer side of the laminar structure 10. The barrier laminate 38 comprises an outer layer 36 and a functional layer 40 adhesively attached to the inner side of the outer layer 36 for example by polyurethane adhesive dots 44.

Figure 8F:
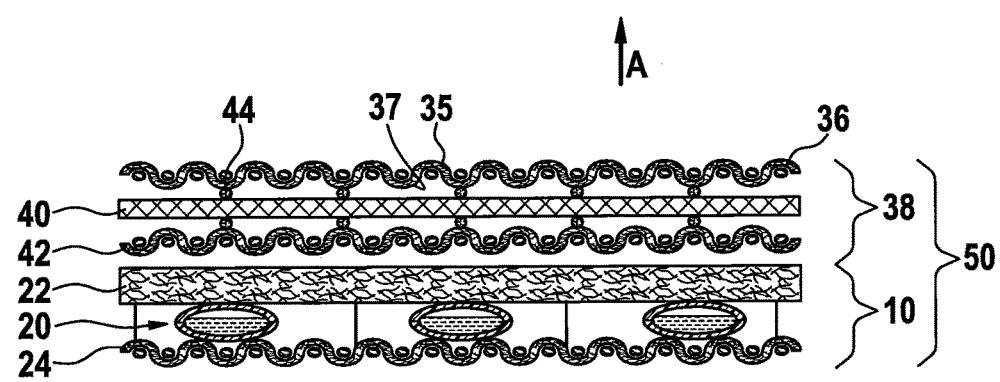

The fabrics composite 50 in FIG. 8f is similar to the fabric composite of FIG. 8e. In this embodiment the barrier laminate 38 has an additional inner textile layer 42 attached to the functional layer 40 such that the functional layer 40 is embedded between outer textile layer 36 and textile layer 42. The textile layer 42 might be for a fire resistant liner made of 125 g/m² Aramide Viscose FR blend 50/50 woven.

Figure 9:
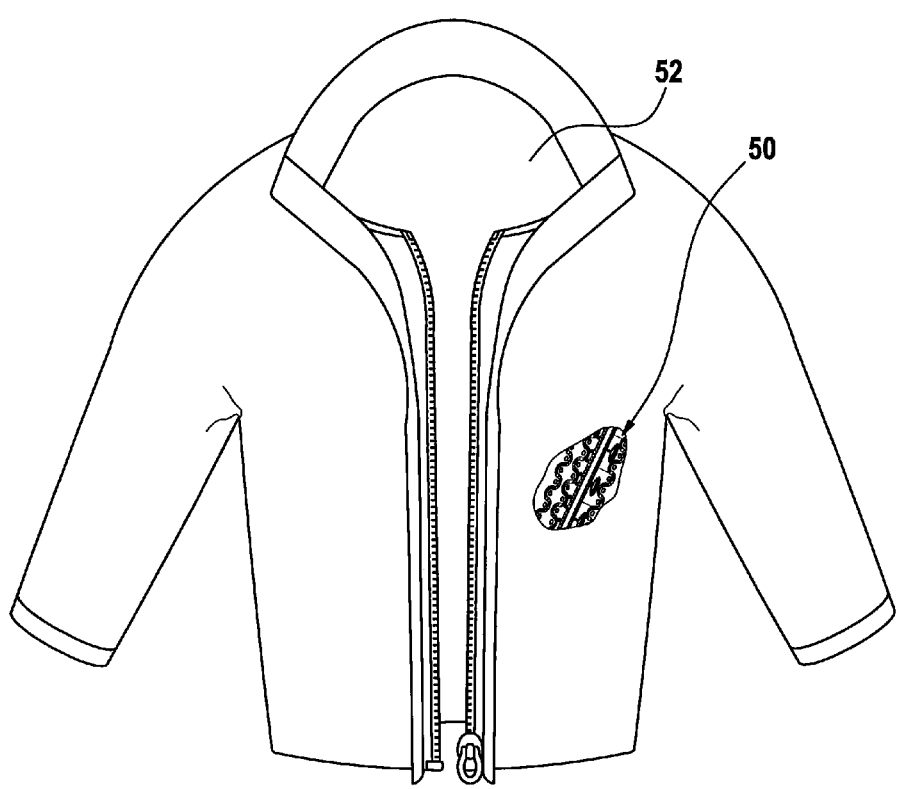

FIG. 9 shows a fire fighter's jacket 52 including fabric composite 50 as shown in FIGS. 8a-8f. Other garments which may comprise fabrics 50 according to invention include jackets, coats, trousers, overalls, shoes, gloves, socks, gaiters, headgear, blankets, and the like or parts of them. The fabric composite may be used in other articles as well, for example in tents or the like.

Figure 10:
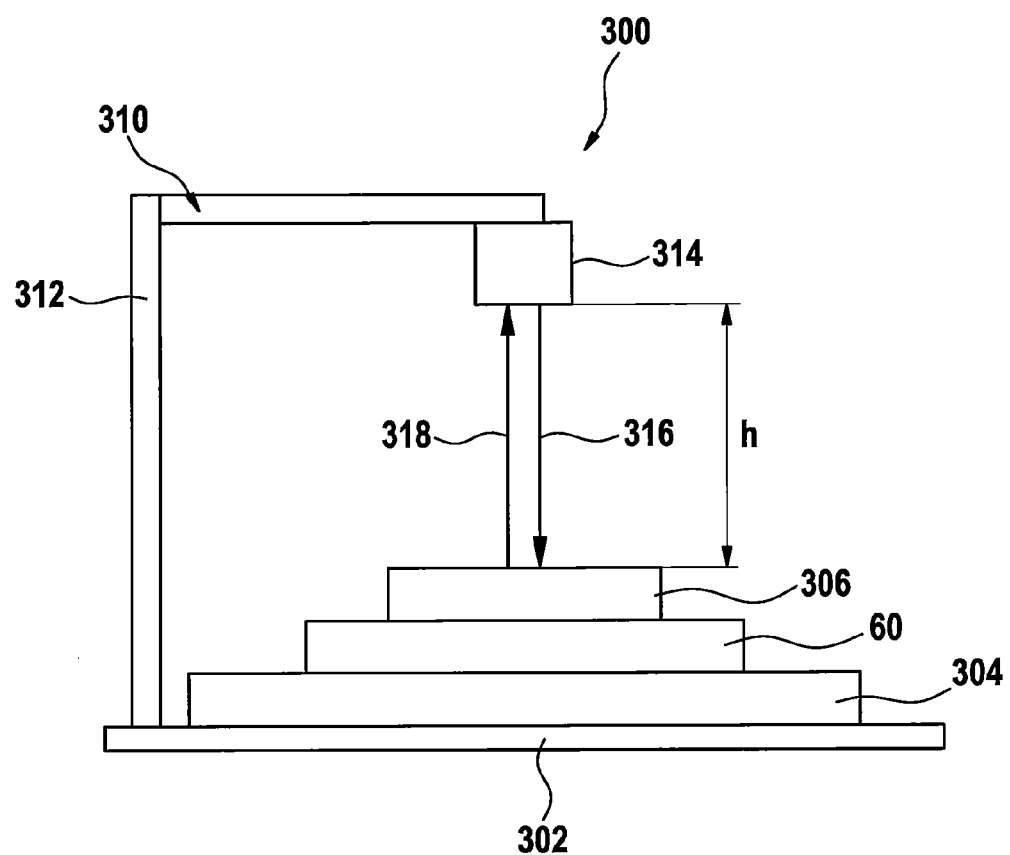
FIG. 10 shows a schematic sketch of an apparatus to measure increase in distance between the first layer and the second layer when the laminar structure is being brought from the unactivated condition into the activated condition.
Figure 11:
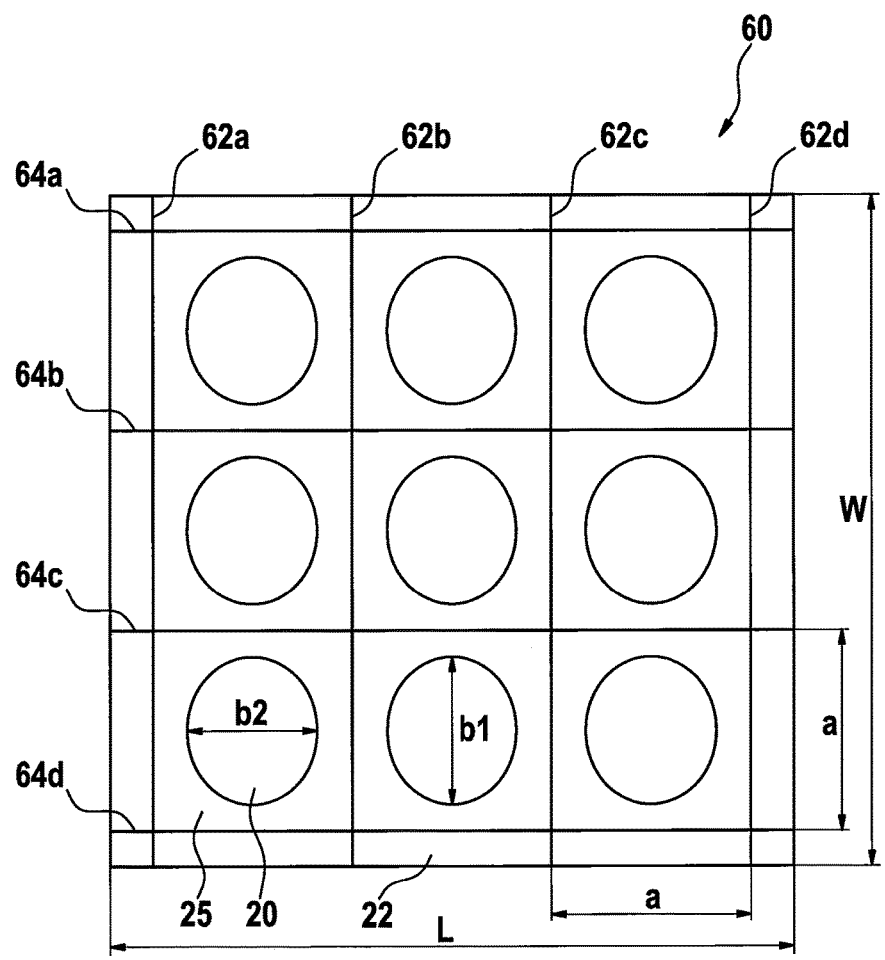
FIG. 11 shows a schematic sketch of a laminar structure test piece for measuring the increase in distance between the first layer and the second layer when the laminar structure is being brought from the unactivated condition into the activated condition.

FIG. 10 shows a schematic sketch of an apparatus 300 to measure increase in distance D between the first layer 22 and the second layer 24 when the laminar structure 10 is being brought from the unactivated condition into the activated condition. In this context FIG. 11 shows a schematic sketch of a laminar structure in the form of a test piece 60 to be used with the apparatus of FIG. 10 for measuring the increase in distance D between the first layer 22 and the second layer 24 when the laminar structure 10 is being brought from the unactivated condition into the activated condition. The test piece 60 is shown in plan view in FIG. 11. A cross-sectional view thereof corresponds to the cross sections shown in FIGS. 6a and 6b. FIG. 11 shows the laminar structure 10 in the unactivated condition.

The test piece 60 used in the test described below has the following configuration:

The test piece 60 forms a quilted structure with:
(a) a first layer (22) made of 55 g/m² spun-laced nonwoven of aramid fiber (available as Vilene Fireblocker from the company Freudenberg, Germany)
(b) a second layer (24) (not visible in FIG. 11), arranged underneath the first layer (22), made of 125 g/m² aramid viscose woven (available as "Nomex Viscose FR blend 50/50 woven from the company Schueler, Switzerland)

The first and second layers 22, 24 have a size of 140 mm (length L)×140 mm (width W). The first and second layers 22, 24 are connected by a plurality of stitched seams 62a-62d, 64a-64d, thus forming a quilted composite. The stitched seams are formed by a single needle lock stitch. In this way, 9 pockets 25 are formed by the quilted composite 60. The pockets 25 each have the shape of a square with a side length of a=40 mm. Each of these pockets 25 receives a respective one of the envelopes 20 made as described above. Single envelopes 20 as shown in FIGS. 2d, 3a have been used to carry out the test measurements. Such envelopes 20 have a slightly elliptical shape when seen from above with larger axis of ellipse b1=23 mm, and smaller axis of ellipse b2=20 mm). 9 envelopes 20 are arranged between the first and the second layers 22, 24 such that a single envelope 20 is spaced to at least one neighbour envelope 20 by one of said stitched seams 62a-62d, 64a-64d. Each of the pockets 25 receives one envelope 20. The envelopes 20 are inserted into the pockets 25 without being fixed to the first layer 22 or second layer 24.

Each of the envelopes is filled with 0.03 g of "3M NOVEC® 1230 Fire Protection Fluid" (chemical formula: $CF_3CF_2C(O)CF(CF_3)_2$) as gas generating agent according to method 2 described above with respect to FIGS. 2a to 2d.

A method for measuring thickness change of such test piece is as follows:

Setup of Measurement Apparatus:

The arrangement for measuring a thickness change of the test piece 60 in response to a change in temperature is shown in FIG. 10. The arrangement comprises a apparatus 300 with a base 302, a heating plate 304, a top plate 306, and a laser based distance measuring device 314.

The heating plate 304 is connected to a heating apparatus (plate 300 mm×500 mm out of a Erichsen, doctor blade coater 509/MC/1+heating control Jumo Matec, with controller Jumo dtron16, connected to 220V/16 A).

Test piece 60 is laid flat on the heating plate 304.

Top plate 306 has the form of a flat disk with a diameter of 89 mm and is made of "Monolux 500" (available from Cape Boards & Panels, Ltd., Uxbridge, England) or an equivalent material. Top plate 306 has a weight of approx 115 g. Top plate 306 is laid flat on top of the test piece 60.

Laser based distance measuring device 310 includes a frame 312 and a distance laser device 314 (laser sensor: Leuze ODSL-8N 4-400-S 12 which is connected to a A/D converter Almemo 2590-9V5 having a reading rate of 3 measurements per second, the A/D converter translates the 0-10 V output of the laser sensor into a 0-400 mm distance reading, accuracy: 0.2 mm on a plain plate). The frame 312 is mounted to the base 302. The distance laser device 314 is and has mounted to a top arm of the frame in such a way that the distance laser device 314 emits a laser beam 316 towards the top surface of the top plate 306 and receives a reflected beam 318. The distance laser device 314 is able to detect a distance h between the distance laser device 314 and the top surface of top plate 306. Preferably, laser beam 316 is emitted orthogonally to top surface of top plate 306.

Temperature gradient of plate 304 is lower than 2K across the plate in the range of the measurement.

Measurement Procedure:

Test is done at room temperature, i.e. controlled climate of 23° C. and 65% relative humidity.

(a) Top plate 306 is placed directly onto heating plate 304 (without test piece 60) to obtain a zero reading $h\_0$.

(b) Then, test piece 60 is placed in between heating plate 304 and top plate 306. Heating plate 304 is heated to a temperature above ambient temperature and 5K below the expected activation temperature of the gas generating agent (e.g up to 44° C. in case of 3M Novec® 1230 Fire Protection Fluid as gas generating agent) to obtain an initial height reading $h\_1$. Thickness of test piece 60 (corresponding to distance between first layer 22 and second layer 24 in unactivated condition) is $D0=h\_0-h\_1$.

(c) Temperature of heating plate is increased in steps of 5K, after each new step is adjusted, distance h is read after 1 minute to calculate a thickness change $h\_1-h$. This procedure is repeated until the maximum expansion of the test piece 60 is reached. Maximum expansion is considered to be reached if thickness change $h\_1-h$ in at least two consecutive 5K steps is identical within 0.4 mm (which is twice the accuracy of the distance measurement tool). Reading $h\_max$ is obtained.

Thickness of test piece 60 (corresponding to distance between first layer 22 and second layer 24 in activated condition) is $D1=h\_0-h\_max$.

Increase in thickness of test piece 60 (corresponding to increase in distance between first layer 22 and second layer 24 in activated condition with respect to unactivated condition) is $D1-D0=h\_1-h\_max$.

In the example of test pieces that are able to undergo a plurality of activation/deactivation cycles the following test procedure is available:

Thickness Reversibility Method:

Set-up of thickness measurement apparatus, as described above, is used.

(a) Top plate 306 is placed directly onto heating plate 304 (without test piece 60) to obtain a zero reading $h\_0$.

(b) Then, test piece 60 is placed in between heating plate 304 and top plate 306. Heating plate 304 is heated to a temperature above ambient temperature and 5K below the expected activation temperature of the gas generating agent (e.g up to 44° C. in case of 3M Novec® 1230 Fire Protection Fluid as gas generating agent) to obtain an initial height reading $h\_1$. Thickness of test piece 60 (corresponding to distance between first layer 22 and second layer 24 in unactivated condition) $D0=h\_0-h\_1$.

(c) Heating cycle:

Target temperature of heating plate 304 is set to a temperature 30° C. above the boiling point of the gas generating agent in the envelope 20 and heating plate 304 is heated with a heating rate of 1 K/min. Increase in thickness (corresponding to increase in distance D between first layer 22 and second layer 24) is measured by distance laser device 314 every 10 s. When heating plate 304 reaches target temperature this temperature is maintained for about 10 min and reading of increase in thickness is continued. After 10 min final increase in thickness is measured (corresponding to distance between first layer 22 and second layer 24 in activated condition of gas generating agent).

(d) Cooling cycle:

Target temperature of heating plate 304 is set to room temperature and heating plate 304 is cooling down by the environment within 1 hour. Decrease in thickness (corresponding to decrease in distance D between first layer 22 and second layer 24) is measured by distance laser device 314 every 10 s. When heating plate 304 reaches target temperature this temperature is maintained for about 10 min and reading of decrease in thickness is continued. After 10 min final decrease in thickness is measured (corresponding to distance between first layer 22 and second layer 24 in unactivated configuration).

Heating cycle (c) and cooling cycle (d) are repeated 3 times. Each time thickness increase at topmost temperature and thickness decrease at lowermost temperature are measured.

Figure 12:
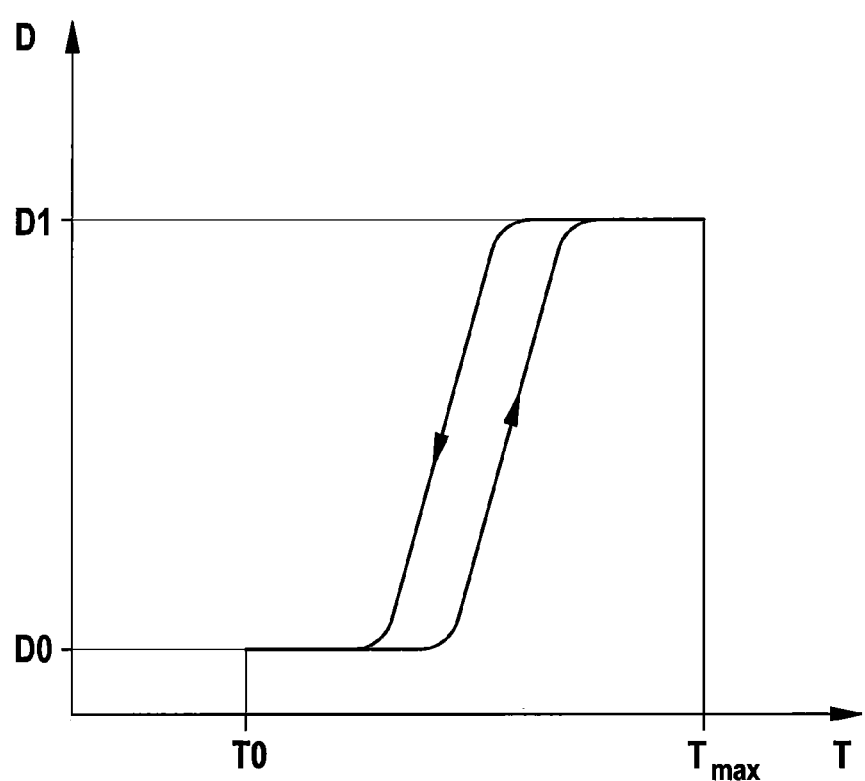
FIG. 12 shows the result of a functionality test for a laminar structure configured to reversibly undergo a plurality of activation/deactivation cycles.

A result of the thickness reversibility test for one heating cycle and one cooling cycle is shown in FIG. 12 in the form of a distance D vs. temperature T diagram. It can be seen that a hysteresis loop is produced. From the topmost plateau of this hysteresis loop the distance D1 between the first layer 22 and second layer 24 in the activated configuration, and from the lowermost plateau distance D0 between the first layer 22 and second layer 24 in the unactivated configuration can be inferred.

For reversible envelopes with a liquid gas generating agent, the following functionality test is available for single envelopes 20:

(a) 2 buckets are prepared. Each bucket is filled with 2 liters of liquid. The first bucket acts as a cold bath and the second bucket acts as a hot bath. The temperatures for the cold bath and the hot bath should be chosen with respect to the activation temperature of the gas generating agent and the onset temperature of condensation/freezing of the gas generating agent. If in one example the gas generating agent is a liquid and the boiling/condensing temperature range is from 47 to 52° C. then a cold bath temperature of 25° C. and a hot bath temperature of 80° C., using water as the liquid in the hot bath and the cold bath, is preferred.

(b) The envelope 20, filled with the gas generating agent 18, is held with a pincer and put it into the hot bath, until the envelope 20 will inflate.

(c) After inflation is complete, inflated envelope 20 is removed from the hot bath immediately and the thickness of the inflated envelope is estimated using a frame with an opening of the expected thickness. Such frame should be made of a material with a low thermal conductivity. As an example, in case the expected thickness of the inflated envelope is 5.5 mm, then using a frame with an opening of 5 mm height and 30 mm width can show that the envelope has reached at least 5 mm (d) The envelope is then put into the cold bath, until it collapses it again. Cycles (b) to (d) are repeated until the inflation is no longer reaching the gap of the frame indicating that functionality of the envelope becomes impaired. After every 10 repetitions the temperature of the liquids inside the 2 buckets is controlled and adjusted to the target, if necessary.

Example of a Fabric Composite:

Example 1, a fabric composite sample 50, according FIG. 8*a* was produced, comprising
- an outer shell in the form of a heat protective layer 36 made of 200 g/m² Nomex Delta T woven available from company Fritsche, Germany;
- a barrier laminate 38 in the form of a Fireblocker N laminate (145 g/m²) available from company W.L. Gore & Associates GmbH, Germany and
- a laminar structure 10 in the form of the fabric composite sample 60 according to FIG. 11.

A reference sample was produced using the same set-up as example 1 without filling the envelopes 20 with gas generating agent 18.

The following test results were obtained with example 1 and the reference sample:

|  | Example 1 | Reference example |
|---|---|---|
| EN367-HTI24-mean [s] | 26.4 | 17.3 |
| RHTI24 mean [s] | 25.4 | 20.5 |
| weight per area [g/m²] | 591 | 580 |
| RET [m² Pa/W] | 21.6 | 21.6 |

"EN367-HTI24-mean" refers to "heat transfer index at 80 W/m²", as defined in DIN EN 367 (1992). This quantity describes the time it takes to obtain an increase of 24 K in temperature at the second side (inner side) of a sample fabric as shown in FIG. 11 when the first side is subject to a heat source of 80 W/m² with a flame.

"RHTI24 mean" refers to "radiative heat transfer index at 40 W/m²", as defined in DIN-EN-ISO 6942 (2002-9). This quantity describes the time it takes to obtain an increase of 24 K in temperature at the second side (inner side) of a sample fabric as shown in FIG. 11 when the first side is subject to a radiative heat source of 40 W/m² with a radiation source with a temperature of 1100° C.

RET refers to water vapor transmission resistance, as defined above.

The invention claimed is:

1. A laminar structure providing adaptive thermal insulation, comprising:
   - a first layer,
   - a second layer,
   - at least one cavity between the first layer and the second layer,
   - a gas generating agent having an unactivated configuration and an activated configuration, and
   - an envelope enclosing the at least one cavity wherein the envelope includes a dosing aid, the dosing aid extending into the cavity and having a portion to which the gas generating agent is applied, said portion being included in the cavity, wherein the dosing aid is made of a material that is able to absorb or adsorb the gas generating agent in the unactivated configuration of the gas generating agent,
   - wherein the laminar structure is configured to reversibly change, in response to an increase in temperature, a distance between the first layer and the second layer, from a first distance in the unactivated configuration of the gas generating agent to a second distance in the activated configuration of the gas generating agent, and in response to a decrease in temperature, from the second distance in the activated configuration of the gas generating agent to the first distance in the unactivated configuration of the gas generating agent.

2. The laminar structure according to claim 1, wherein the gas generating agent is adapted to generate gas in the cavity in response to temperature in the cavity exceeding a predetermined activation temperature of the gas generating agent.

3. The laminar structure according to claim 1, wherein the second distance between the first layer and the second layer in the activated configuration of the gas generating agent is larger than the first distance between the first layer and the second layer in the unactivated configuration of the gas generating agent by a distance of 1 mm or more.

4. The laminar structure according to claim 1, wherein the envelope is configured such that a volume of the at least one cavity increases in response to the increase in gas pressure inside the at least one cavity.

5. The laminar structure according to claim 1, wherein the envelope is fluid tight.

6. The laminar structure according to claim 1, wherein the envelope is made of a non-stretchable material.

7. The laminar structure according to claim 1, wherein the envelope is made of a temperature resistant material with respect to a range of temperatures in the cavity in the activated configuration.

8. The laminar structure according to claim 1, wherein the envelope is made of at least one envelope piece of a fluid tight material.

9. The laminar structure according to claim 1, wherein the envelope is made of a metal/polymer composite material.

10. The laminar structure according to claim 1, wherein the gas generating agent is in the form of a liquid in the unactivated configuration, the activation temperature of the adaptive thermal insulation laminar structure corresponding to a boiling temperature of the gas generating agent.

11. The laminar structure according to claim 10, wherein the gas generating agent is in the form of a solid in the unactivated configuration, the activation temperature of the adaptive thermal insulation laminar structure corresponding to a sublimation or decomposition temperature of the gas generating agent.

12. The laminar structure according to claim 10, wherein the gas generating agent has an evaporation temperature below 200° C.

13. The laminar structure according to claim 12, wherein the liquid comprises $CF_3CF_2C(O)CF(CF_3)_2$.

14. The laminar structure according to claim 1, wherein the gas generating agent is in the form of a liquid, a gel or a solid in the unactivated configuration, the activation temperature of the adaptive thermal insulation laminar structure being a temperature which corresponds to the activation energy of a chemical reaction leading to release of at least one gaseous compound from the gas generating agent.

15. The laminar structure according to claim 1, wherein the dosing aid is smaller than the cavity in the unactivated configuration of the gas generating agent.

16. The laminar structure according to claim 1, wherein the dosing aid is made of a material that is able to support the formation of a fluid tight seal when being welded together with the envelope.

17. The laminar structure according to claim 16, wherein the dosing aid is provided as a sheet forming a weldable dosing aid layer.

18. The laminar structure according to claim 1, wherein the envelope includes an intermediate layer separating the cavity into a first subcavity and a second subcavity, the intermediate layer having a first side and a second side.

19. The laminar structure according to claim 18, wherein the intermediate layer is made of a fluid tight material and is configured to support the formation of a fluid tight seal when being welded together with the envelope.

20. The laminar structure according to claim 18, wherein the gas generating agent is applied to the first side, the second side, or the first side and the second side of the intermediate layer.

21. The laminar structure according to claim 1, further comprising an envelope structure formed by at least two of said envelopes bonded together.

22. The laminar structure according to claim 1, further comprising a plurality of cavities, each of the cavities being encased by a respective said envelope, wherein the envelopes are arranged a distance from each other.

23. The laminar structure according to claim 1, wherein the cavity has a lateral dimension of 1 mm or more in the unactivated configuration and a thickness dimension of 2 mm or less.

24. The laminar structure according to claim 1, wherein the cavity has a relative volume increase between 10 and 2000 with respect to the volume of the cavity when in the activated configuration compared to the unactivated configuration.

25. The laminar structure according to claim 8, wherein the envelope is made of at least a first piece and a second piece, said first and second pieces being bonded together in a fluid tight manner.

26. The laminar structure according to claim 12, wherein the evaporation temperature is between 30° C. and 100° C.

27. The laminar structure according to claim 1, wherein the cavity has a lateral dimension of 5 mm or more in the unactivated configuration and a thickness dimension of 2 mm or less.

28. A laminar structure providing adaptive thermal insulation, comprising:

a first layer,
a second layer,
at least one cavity between the first layer and the second layer,
a gas generating agent having an unactivated configuration and an activated configuration, and
an envelope enclosing the at least one cavity wherein the envelope includes a dosing aid, the dosing aid extending into the cavity and having a portion to which the gas generating agent is applied, said portion being included in the cavity, wherein the dosing aid is made of a material that is able to support the formation of a fluid tight seal when being welded together with the envelope,
wherein the laminar structure is configured to reversibly change, in response to an increase in temperature, a distance between the first layer and the second layer, from a first distance in the unactivated configuration of the gas generating agent to a second distance in the activated configuration of the gas generating agent, and in response to a decrease in temperature, from the second distance in the activated configuration of the gas generating agent to the first distance in the unactivated configuration of the gas generating agent.

29. The laminar structure according to claim 28, wherein the dosing aid is provided as a sheet forming a weldable dosing aid layer.

30. The laminar structure according to claim 28, wherein the gas generating agent is adapted to generate gas in the cavity in response to temperature in the cavity exceeding a predetermined activation temperature of the gas generating agent.

31. The laminar structure according to claim 28, wherein the second distance between the first layer and the second layer in the activated configuration of the gas generating agent is larger than the first distance between the first layer and the second layer in the unactivated configuration of the gas generating agent by a distance of 1 mm or more.

32. The laminar structure according to claim 28, wherein the envelope is configured such that a volume of the at least one cavity increases in response to the increase in gas pressure inside the at least one cavity.

33. The laminar structure according to claim 28, wherein the gas generating agent is in the form of a liquid in the unactivated configuration, the activation temperature of the adaptive thermal insulation laminar structure corresponding to a boiling temperature of the gas generating agent.

34. The laminar structure according to claim 28, wherein the gas generating agent is in the form of a liquid, a gel or a solid in the unactivated configuration, the activation temperature of the adaptive thermal insulation laminar structure being a temperature which corresponds to the activation energy of a chemical reaction leading to release of at least one gaseous compound from the gas generating agent.

35. The laminar structure according to claim 28, wherein the dosing aid is made of a material that is able to absorb or adsorb the gas generating agent in the unactivated configuration of the gas generating agent.

36. The laminar structure according to claim 28, wherein the envelope includes an intermediate layer separating the cavity into a first subcavity and a second subcavity, the intermediate layer having a first side and a second side.

37. The laminar structure according to claim 28, further comprising an envelope structure formed by at least two of said envelopes bonded together.

38. The laminar structure according to claim 28, further comprising a plurality of cavities, each of the cavities being encased by a respective said envelope, wherein the envelopes are arranged a distance from each other.

39. The laminar structure according to claim 28, wherein the cavity has a lateral dimension of 1 mm or more in the unactivated configuration and a thickness dimension of 2 mm or less.

40. The laminar structure according to claim 28, wherein the cavity has a relative volume increase between 10 and 2000 with respect to the volume of the cavity when in the activated configuration compared to the unactivated configuration.

41. The laminar structure according to claim 28, wherein the envelope is made of a temperature resistant material with respect to a range of temperatures in the cavity in the activated configuration.

* * * * *